(12) United States Patent
Suenaga et al.

(10) Patent No.: US 6,498,893 B1
(45) Date of Patent: *Dec. 24, 2002

(54) RECORDING/REPRODUCING APPARATUS

(75) Inventors: Shinichi Suenaga, Kanagawa (JP); Kosuke Yoshimura, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,616

(22) Filed: Apr. 30, 1997

(30) Foreign Application Priority Data

May 1, 1996 (JP) .......................... 08-110857

(51) Int. Cl.[7] ................................ H04N 5/91
(52) U.S. Cl. .......................... 386/46; 386/96
(58) Field of Search .............. 386/39, 46, 45, 386/52, 96, 97, 98, 99, 100, 101, 102, 103, 104, 105, 106, 125, 126, 128; 369/47, 54, 60; 360/7; 348/460–461, 473–474

(56) References Cited

U.S. PATENT DOCUMENTS 5,241,428 A * 8/1993 Goldwasser et al. .......... 360/7
5,434,678 A * 7/1995 Abecassis .................... 386/52
5,815,634 A * 9/1998 Daum et al. .................. 386/96

* cited by examiner

Primary Examiner—Thai Tran
Assistant Examiner—Christopher Onuaku
(74) Attorney, Agent, or Firm—Frommer Lawrence & Haug LLP; William S. Frommer; Bruno Polito

(57) ABSTRACT

A recording/reproducing apparatus by which optimum playback pictures can be produced eve in case of parallel recording/reproduction. A storage unit 123 transiently stores video signals obtained from an overwrite type disc-shaped recording medium 102. A signal processing unit 122 decodes video signals stored in the storage unit 123. A holding unit 124 holds video signals decoded by the signal decoding unit 122. A control unit 101 performs control of the entire apparatus and also performs control for address management and data transfer of the disc-shaped recording medium 102 so that, if the apparatus is set to a mode of performing a playback operation while the recording operation is going on, the storage means 123 stores plural fields of the video signals and the holding unit 124 interpolates the video signals.

11 Claims, 15 Drawing Sheets

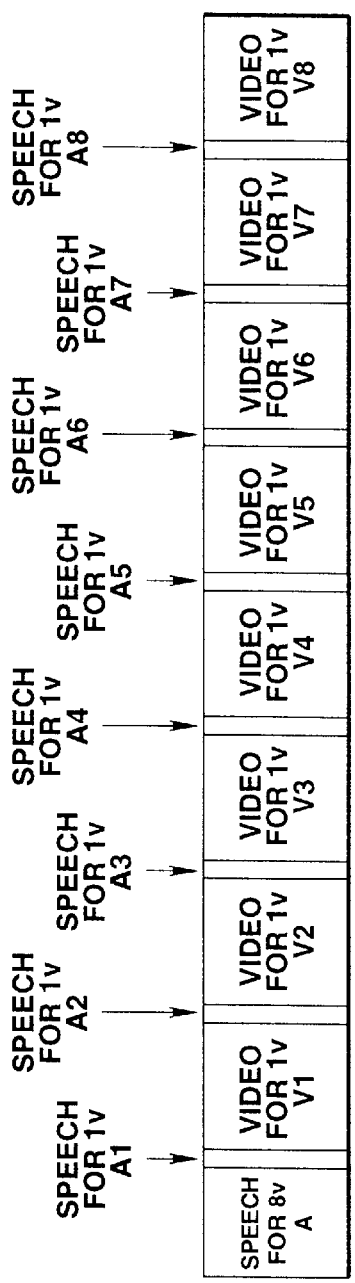
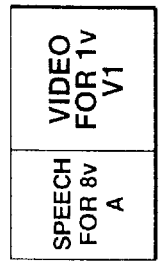
FIG.4A FORMAT 300a
FIG.4B FORMAT 300b

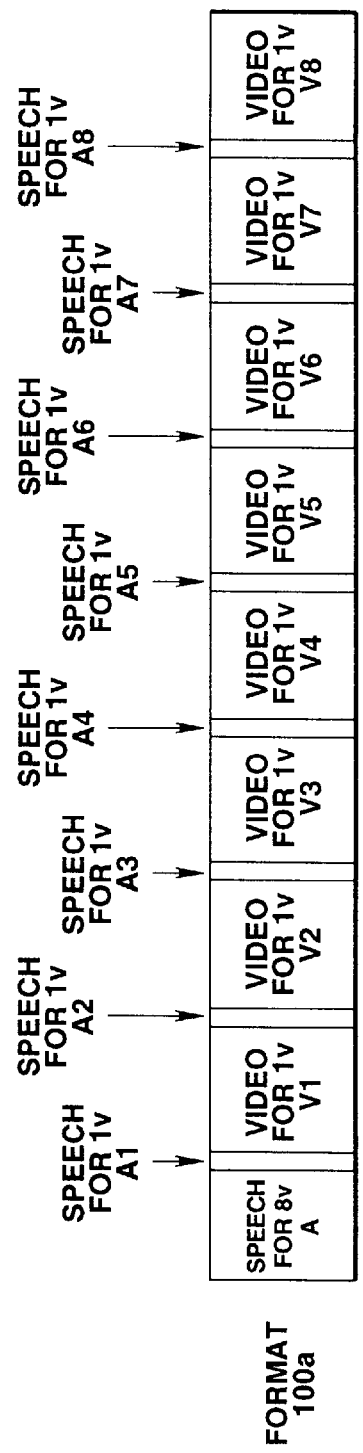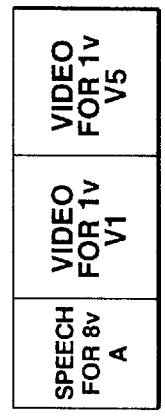
FIG.9A FORMAT 100a
FIG.9B FORMAT 100b

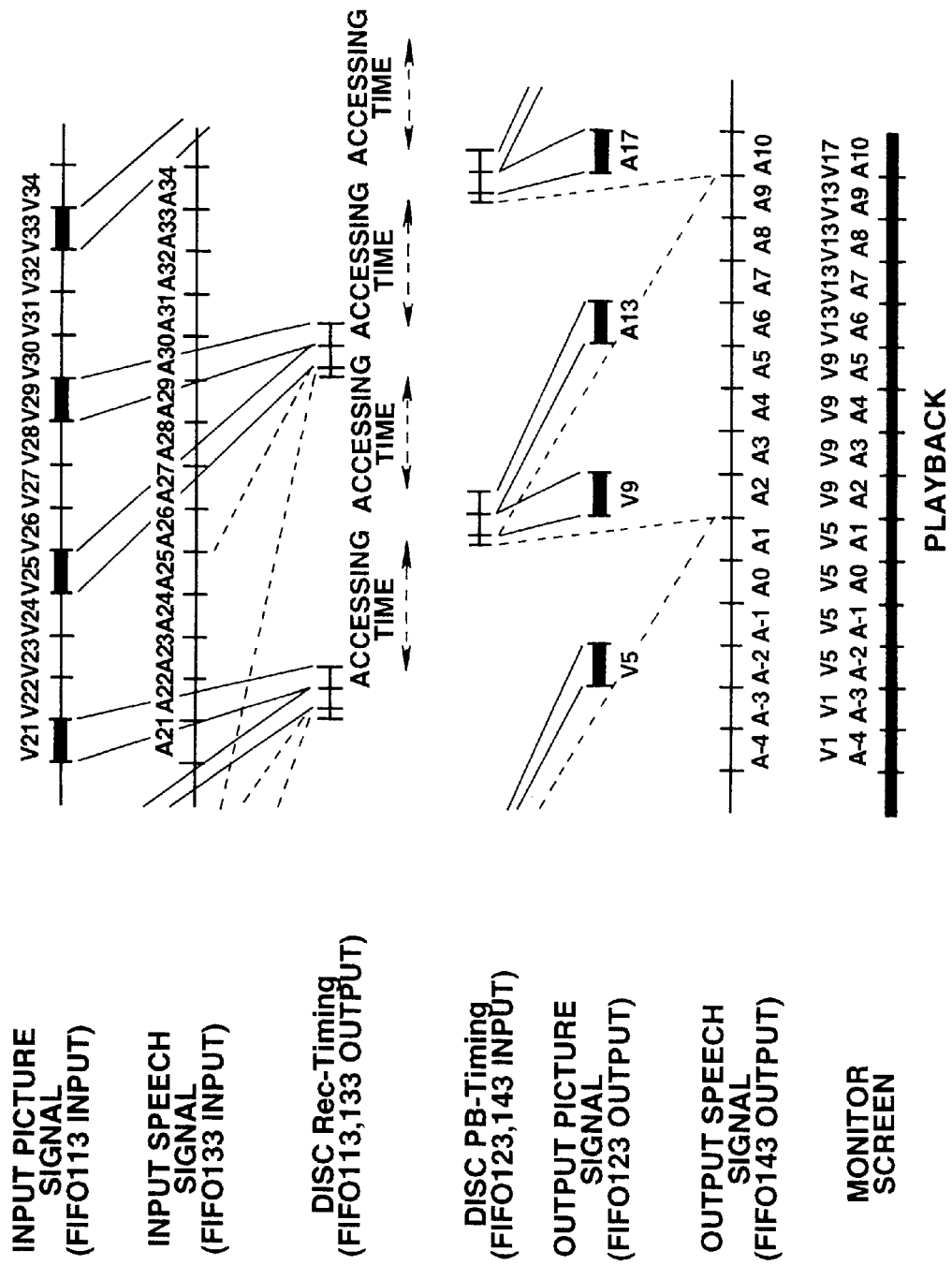

RECORDING/REPRODUCING APPARATUS

BACKGROUND OF THE INVENTION

Field of the Invention

This invention relates to a recording/reproducing apparatus for recording and reproducing video signals and speech signals on or from an optical disc or a magnetic disc as a overwrite type disc-shaped recording medium.

Recently, in a recording/reproducing apparatus for recording and reproducing video signals and speech signals on or from an optical disc or a magnetic disc as a overwrite type disc-shaped recording medium, a technique of perpetually recording live broadcast of, for example, a television program at all times in order to retrogressively view a sole scene which has been overlooked and which it is desired to re-view by the viewer.

Such a recording/reproducing apparatus includes, as shown in FIG. 1, an analog/digital (A/D) converter 311 for digitizing picture signals entering an input terminal $I_{3a}$, and a synchronization separating circuit 310 for extracting vertical synchronization signal of the picture signal entering the input terminal $I_{3a}$. The recording/reproducing apparatus also includes a compression circuit 312 for encoding picture data from an A/D converter 311 in synchronism with vertical synchronization signal from the synchronization separating circuit 310 and a first-in first-out buffer (FIFO) 313 for storing the picture data from the A/D converter 311. The FIFO buffer is referred to herein as a buffer for video recording. The recording/reproducing apparatus also includes an A/D converter 331 for digitizing speech signals entering an input terminal $I_{3c}$ and a compression circuit 332 for encoding speech data from the A/D converter 331 in synchronism with a vertical synchronization signal from the synchronization separating circuit 310. The recording/reproducing apparatus also includes a FIFO buffer 333 for storing speech data from the compression circuit 332. The FIFO buffer 333 is referred to herein as a buffer for speech recording. The recording/reproducing apparatus further includes a disc drive 303 for recording video data from speech data from the FIFO 313 for storing the picture data and the speech data from the FIFO buffer 333 for storing speech data on a overwrite type disc 302 in accordance with a pre-set format and for reproducing the speech data and the video data recorded on the disc 302.

The input terminals $I_{3a}$ and $I_{3c}$ are connected to, for example, a tuner, not shown, configured for receiving live broadcast.

The recording/reproducing apparatus 300 also includes a FIFO buffer for storing speech data obtained by the disc drive 303 and an expansion circuit 342 for decoding the speech data from the FIFO buffer 343 in synchronism with the vertical synchronization signals from the synchronization separation signal 310. The FIFO buffer 343 is referred to herein as a buffer for speech reproduction. The recording/reproducing apparatus 300 also includes digital analog (D/A) converter 341 for converting speech data from the expansion circuit 342 into analog data for outputting at an output terminal $I_{3d}$, and a FIFO buffer 323 for storing video data obtained from the disc drive 303. The FIFO buffer 323 is referred to herein as a buffer for video reproduction. The recording/reproducing apparatus 300 further includes an expansion circuit 322 for decoding video data from the expansion circuit 322 and a D/A converter 321 for converting the video data from the expansion circuit 322 into analog data for outputting at an output terminal $I_{3b}$. The speech data stored in the FIFO buffer for speech reproduction 343 is also supplied to the disc drive 303.

The output terminals $I_{3b}$ and $I_{3d}$ are connected to a monitor not shown, configured for displaying and outputting a picture derived from the video signals supplied thereto via output terminal $I_{3b}$ and for outputting the speech derived from the speech signals supplied thereto from a speaker, not shown, via output terminal $I_{3d}$.

The recording/reproducing apparatus 300 also includes a system controller 301 for controlling an output of the buffer for video recording 313 to the disc drive 303, an output of the buffer for speech recording 333 to the disc drive 303, an output of the buffer for speech reproduction 343 to the disc drive 303 and an output of the disc drive 303 to the buffer for speech reproduction 343 and to the buffer for video reproduction 323. The system controller 301 is configured for performing control processing based on a vertical synchronization signal from the synchronization separation circuit 310, a full flag $F_{fu}$ from the buffer 313 for video recording, an empty flag $F_{em}$ from buffer 323 for video reproduction and a transfer permission flag $_{Fok}$ from the disc drive 303.

There is provided on the output side of the D/A converter 321 a switch 320 to which are supplied video signals from the input terminal $I_{3a}$ and video signals from the D/A converter 321. There is also provided on the output side of the D/A converter 341 a switch 340 to which are supplied speech signals from the input terminal $I_{3c}$ and speech signals from the D/A converter 341. Under switching control by the system controller 301, not shown, the switches 320, 340 are changed over to the input terminal $I_{3a}$ and to the input terminal $I_{3c}$ during the recording operation, respectively, and to the D/A converters 321, 341 during the playback operation, respectively.

There is also provided on the input side of the buffer for speech reproduction a switch 344 to which are supplied speech data from the compression circuit 332 and speech data derived from the disc drive 303. Under switching control by the system controller 301, not shown, the switch 344 is changed over to the side of the compression circuit 332 and to the side of the disc drive 303 during the recording operation and during the reproducing operation, respectively.

The above-described recording/reproducing apparatus uses a one-shoat playback system of temporarily interrupting the recording operation and a parallel recording/reproducing system of performing the payback operation while continuing the recording operation, in order to permit the user to regressively view the scene he or she has just viewed for a moment.

Referring to FIG. 2, if video signals and speech signals VA0, VA1, VA2, . . . from a tuner receiving the live broadcast, referred to herein as input signals, are supplied to the recording/reproducing apparatus 300, and the playback mode by the one-shot playback system, referred to herein as one-shot playback mode, is set directly after the end of inputting of the input signal VA5 by the key input by the user, the recording/reproducing apparatus 300 momentarily discontinues the recording operation at the same time as the one-shot playback mode is set. At this time, the input signals VA0 to VA5 have been recorded on the disc 302. The recording/reproducing apparatus 300 then reproduces the previously recorded input signals VA2 to VA5 from the disc 302. Subsequently, the recording/reproducing apparatus 300 starts the recording operation for the currently inputted input signals VA10, VA11, . . .

Thus, until the recording/reproducing apparatus 300 is set to the one-shot playback mode, a live picture corresponding to the input signals VA0 to VA5 from the tuner, not shown, for receiving the live broadcast, is displayed on the monitor, not shown. Once the recording/reproducing apparatus 300 is set to the one-shot playback mode, the playback picture corresponding to the input signals VA2 to VA5 is displayed on the monitor. The recording/reproducing apparatus 300 does not perform the recording operation for the input signals VA6 to VA9 entered during the period the playback picture is displayed on the monitor. After the end of display of the playback picture corresponding to the input signals VA2 to VA5, a live picture corresponding to the currently inputted input signals VA10, VA11, . . . is displayed.

On the other hand, if the playback mode by the parallel recording/reproducing system, referred to herein as the parallel recording/reproducing mode, is set for the recording/reproducing apparatus 300 directly after the end of inputting of the input signals VA5, by the key input by the user, the recording/reproducing apparatus 300 reproduces the previously recorded input signals VA2, VA3, VA4, . . . from the disc 302, at the same time as it continues the recording operation.

Thus, until the recording/reproducing apparatus 300 is set to the parallel recording/reproducing mode, a live picture corresponding to the input signals VA0 to VA5 from the tuner, not shown, designed for receiving the love broadcast, is displayed on a monitor, not shown. Once the recording/reproducing apparatus 300 is set to the parallel recording/reproducing mode, the playback picture corresponding to the input signals VA2, VA3, VA4, . . . is displayed on the monitor. Under this condition, the recording/reproducing apparatus 300 performs the recording operation for the currently entered input signals VA6, VA7, VA8, . . .

For performing the above-described one-shot playback mode operation and parallel recording/reproducing mode operation, the recording/reproducing apparatus 300 performs full-field playback operation and frame-skip playback operation during the one-shot playback mode operation and parallel recording/reproducing mode operation, respectively, using a first format comprised of blocks of plural fields constituted by the speech and the video not thinned out on the time axis and a second format comprised of plural blocks constituted by the speech not thinned out on the time axis and video thinned out on the time axis.

For example, if the recording/reproducing apparatus 300 manages picture data and speech data for 8 vertical synchronization periods (V), a format 300a for one block of the first format includes speech data A1 for 1 V, a video data V1 for 1 V, speech data A2 for 1 V, . . . video data V2 for 1 V, . . . speech data A8 for 1 V and video data V8 for 1 V, recorded in succession to the speech data A for 8 V, as shown in FIG. 4A. On the other hand, a format 300b for one block of the second format includes video data V 1 for 1 V in succession to the speech data A for 8 V.

If the recording/reproducing apparatus 300 is not set to the one-shot playback mode, to the parallel recording/reproducing mode nor to the usual playback mode, referred to herein as the usual mode, the recording/reproducing apparatus 300 necessarily records on the disc 302 the video data and the speech data from the tuner, not shown, designed for receiving the live broadcast, in accordance with the format 300a.

FIGS. 5 and 6 are timing charts for input/output data for the buffers 313, 323, 333 and 343. In FIGS. 5 and 6, each division of video data V-6, V-5, V-4, . . . and each division of the speech data A-6, A-5, A-4, . . . denotes one-field time of video signals.

Referring to FIGS. 1, 4A, 4B and 6, the operation for each set mode of the recording/reproducing apparatus 300 is explained in detail.

First, in the usual mode of the recording/reproducing apparatus 300, the switch 344 is changed over to the side of the compression circuit 332, under switching control by the system controller 301.

The video signals of V1, entering the input terminal $I_{3a}$ during the V1 period, is digitized by the A/D converter 311 and encoded by the compression circuit 312.

Simultaneously, the speech signal A1 entering the input terminal $I_{3c}$ is digitized by the A/D converter 331 and encoded by the compression circuit 332.

The video data V1, obtained on encoding by the compression circuit 312, is stored in the video recording buffer 313. If video data for 1 V, that is V1 video data, is stored in the video recording buffer 313, the full-flag $F_{fu}$ is set to '1' and routed to the system controller 301.

The A1 speech data obtained on encoding by the compression circuit 342 is stored in the speech recording buffer 343.

Based on the full flag $F_{fu}$ (='1') from the video recording buffer 313, the system controller 301 reads out from the speech recording buffer 333 the speech data A-6 to A0 stored therein after encoding by the compression circuit 332. The system controller 301 routes to the disc drive 303 the command and the address for recording data of the disc 302 and the speech data A-6 to A0 read out from the speech recording buffer 333.

Based on the address and the command from the system controller 301, the disc drive 303 records the speech data A-6 to A0 from the system controller 301 on the disc 302.

When the speech data A-6 to A0 has been recorded on the disc 302 by the disc drive 303, the system controller 301 reads out the A1 speech data stored in the speech recording buffer 343 and routes the read-out speech data to the disc drive 303.

The disc drive 303 records the A1 speech data from the system controller 301 in an address of the disc 302 next following the A0 speech data.

The system controller 301 then reads out the V1 video data stored in the video recording buffer 313 and routes the read-out video data to the disc drive 303.

The disc drive 303 records the V1 video data from the system controller 301 in an address of the disc 302 next following the A1 speech data.

If the V1 video data is read out by the system controller 301, the video recording buffer 313 sets the full flag $F_{fu}$ to '0' which is routed to the system controller 301. If the 1V video data, that is video data for V2, is stored during the next V2 period, the video recording buffer again sets the full flag $F_{fu}$ to '1' which is routed to the system controller 301.

Thus the system controller 301 reads out the A2 speech data stored in the speech recording buffer 343 after encoding by the compression circuit 332 during the V2 period and routes the read out data to the disc drive 303. The system controller 301 then reads out the V2 video data stored in the video recording buffer 313 from the video recording buffer 313 to route the read-out video data to the disc drive 303.

The disc drive 303 then records out the A2 speech data from the system controller 301 in an address next following the V1 video data of the disc 302 and subsequently records the V2 video data in an address next following the A2 speech data on the disc 302.

By the repetition of the above-described sequence of operations, block data comprised of the A-6 to A0 speech data, A1 video data, V1 speech data, . . . A8 speech data and V8 video data are recorded on the disc 302, in accordance with the format 300a, so that plural block data are recorded in succession.

If, by the key input by the user, the recording/reproducing apparatus 300 is set to the parallel recording/reproducing mode, the switch 344 is changed over to the side of the disc drive 303 under switching control by the system controller 301.

The system controller 301 routes to the disc drive 303 the command and the address in which is recorded an optional block data selected from the block data continuously recorded on the disc 302 as described above in accordance with the format 300a.

By the address and the command from the system controller 301, the disc drive 303 reproduces video data and the speech data in the optional block data from the disc 302.

That is, in FIG. 5, the system controller 301 routes to the disc drive 303 the playback command and the address of the disc 302 in which are recorded the A-6 to A1 speech data. Thus the disc drive 303 reproduces the A-6 to A1 speech data from the disc 302.

The system controller 301 writes the A-6 to A1 speech data obtained from the disc drive 303 via switch 344 on the speech reproducing buffer 343 in synchronism with the vertical synchronization signals from the synchronization separation circuit 310.

The disc drive 303 then reproduces V1 video data from an address next following the A1 speech data of the disc 302.

After resetting the write address of the video reproducing buffer 323, the system controller 301 writes the V1 video data obtained by the disc drive 303 in the video reproducing buffer 323.

The expansion circuit 322 resets the reading of the video reproducing buffer 323 in synchronism with the vertical synchronization signals from the synchronization separation circuit 310 for reading out the V1 video data stored in the video reproducing buffer 323 eight times on end and for sequentially decoding the read-out video data to route the decoded video data to the switch 320.

At this time, the expansion circuit 342 decodes the A-6 to A1 speech data stored in the speech reproducing buffer 343, in synchronism with the vertical synchronization signals from the synchronization separation circuit 310, for outputting the decoded speech data via switch 340 and output terminal $I_{3d}$ to the speaker.

Thus, a playback picture corresponding to the V1 video signals is displayed for eight fields on the monitor, while the speech corresponding to the speech signals A-6 to A1 are outputted via speaker, not shown.

If the video data for 8 V and the speech data are reproduced as described above, the recording/reproducing apparatus 300 performs the recording in accordance with the format 300b.

That is, the system controller 301 reads out A2 to A9 speech data encoded by the compression circuit 332 and stored in the speech recording buffer 333 during the V2 to V9 period. The system controller 301 routes to the disc drive 303 the command and the address next following the V8 video data of the disc 302 and the A2 to A9 speech data read out from the video recording buffer 333.

Based on the address and the command from the system controller 301, the disc drive 303 records the A2 to A9 speech data from the system controller 301 in an address next following the V8 video data of the disc 302.

The system controller 301 then reads out V9 video data from the system controller 301 in an address next following the A9 speech data on the disc 302.

Thus, the A2 to A9 speech data and the V9 video data are recorded on the disc 302 in accordance with the format 300b.

The system controller 301 then routes to the disc drive 303, in synchronism with the vertical synchronization signals from the synchronization separation circuit 310, at a timing of the start of the eighth playback of the V1 video data, an address by which the 8V speech data of from A2 to A9 have been recorded on the disc 302. This enables the disc drive 303 to reproduce the A2 to A9 speech data from the disc 302.

The system controller 301 then causes the A2 to A9 speech data from the disc drive 303 to be written via switch 344 in the speech reproducing buffer 343.

The disc drive 303 then reproduces the V9 video data from an address next following the A9 speech data of the disc 302.

After resetting the write address of the video reproducing buffer 323, the system controller 301 causes the V9 video data reproduced from the disc drive 303 to be written in the video reproducing buffer 323.

After read-setting the video reproducing buffer 323 in synchronism with the vertical synchronization signals from the synchronization separation circuit 310, the expansion circuit 322 reads out the V9 video data stored in the video reproducing buffer 323 eight times on end and sequentially decodes the read-out data to output the decoded data to a monitor, not shown, via D/A converter 321, switch 320 and output terminal $I_{3b}$.

The expansion circuit 342 sequentially decodes, in synchronism with the vertical synchronization signals from the synchronization separation circuit 310, the A2 to A9 speech data stored in the speech reproducing buffer 343, and outputs the decoded data via D/A converter 341, switch 340 and output terminal $I_{3d}$ to the speaker.

This, a playback picture corresponding to the V9 video signals are displayed for 8 fields on the monitor, while the speech corresponding to the A2 to A9 speech signals is outputted by a speaker, not shown.

The above playback operation is repeated until 'stop' of the parallel recording/reproduction is commanded by the key input by the user.

In the recording/reproducing apparatus 300, block data conforming to the formats 300a or 300b are continuously recorded on the disc 302 and reproduction is performed beginning from a specified one of the plural block data recorded continuously on the disc 302 which is in accord with the format 300a. Thus it is supervised by the system controller 303 whether the reproduced block has been recorded in accordance with the format 300a or in accordance with the format 300b.

With the above-described conventional recording/reproducing apparatus, such as the above-described conventional recording/reproducing apparatus 300, the number of fields of video data of the format 300b is one, that is the number of frames during the parallel recording/reproducing mode is one for the number of fields in a block of the format 300a, as shown in FIG. 4B. Thus, if 8 V video data and speech data are managed, the playback operation is ⅛ frame-skip operation during the parallel recording/reproduction, resulting in an unnatural picture obtained by the recording/reproducing apparatus.

If, for overcoming this problem, the number of reproduced frames is simply increased in carrying out the parallel recording/reproduction, it becomes necessary for the recording/reproducing apparatus to access the recording point and the playback point on the disc alternately a number of times equal to the increased number of the playback frames. Thus, much time is consumed in the seek operation for the disc such that the recording and reproduction cannot be completed within a pre-set time.

Moreover, with the above-described recording/reproducing apparatus, since the compression and expansion need to be performed on the video signals at all times for the parallel recording/reproducing mode, it is necessary to provide a compression circuit separately from the expansion circuit. Since these circuits are costly, the recording/reproducing apparatus cannot be reduced in production cost.

SUMMARY OF THE INVENTION

It is therefore an object of the present invention to provide a recording/reproducing apparatus in which a satisfactory playback picture can be obtained for the parallel recording/reproducing mode.

It is another object of the present invention to provide a recording/reproducing apparatus in which production cost can be reduced.

The present invention provides a recording/reproducing apparatus in which video signals and speech signals are recorded in synchronism with each other on an overwrite type disc-shaped recording medium based on a selected setting of the processing mode, and in which the video and the speech are reproduced in synchronism with each other from the recording medium having the video signals and the speech signals recorded thereon. The apparatus includes storage means for storing the video signals obtained from the recording medium, decoding means for decoding the video signals stored in the storage means, holding means for holding the video signals decoded by the decoding means and control means for controlling the address management and data transfer for the recording medium and for controlling the overall operation of the apparatus. In the processing mode in which the recording and the reproduction are carried out alternately so that reproduction is performed while the recording is going on, the storage means stores plural fields of the video signals and the holding means performs interpolation of video signals.

In the recording/reproducing apparatus according to the present invention, the signal processing means has the expansion function of decoding the video signals stored in the storage means, and the compression function of encoding the video signals recorded on the recording medium. In the processing mode in which the recording and the reproduction are carried out alternately so that reproduction is performed while the recording is going on, the control means switches the operating timing of the entire apparatus and switches between the expansion function and the compression function of the signal processing means so that the recording operation and the reproducing operation will be carried out alternately.

BRIEF DESCRIPTION OF THE DRAWINGS

FIG. 4 illustrates a disc format employed in the recording/reproducing apparatus shown in FIG. 1.

FIG. 9 illustrates a disc format employed in the recording/reproducing apparatus shown in FIG. 7.

FIG. 15 shows a timing chart in case the recording/reproducing apparatus shown in FIG. 7 is set to the parallel recording/reproducing mode, with the input video signals being V20 ff.

DESCRIPTION OF THE PREFERRED EMBODIMENTS

Figure 1:
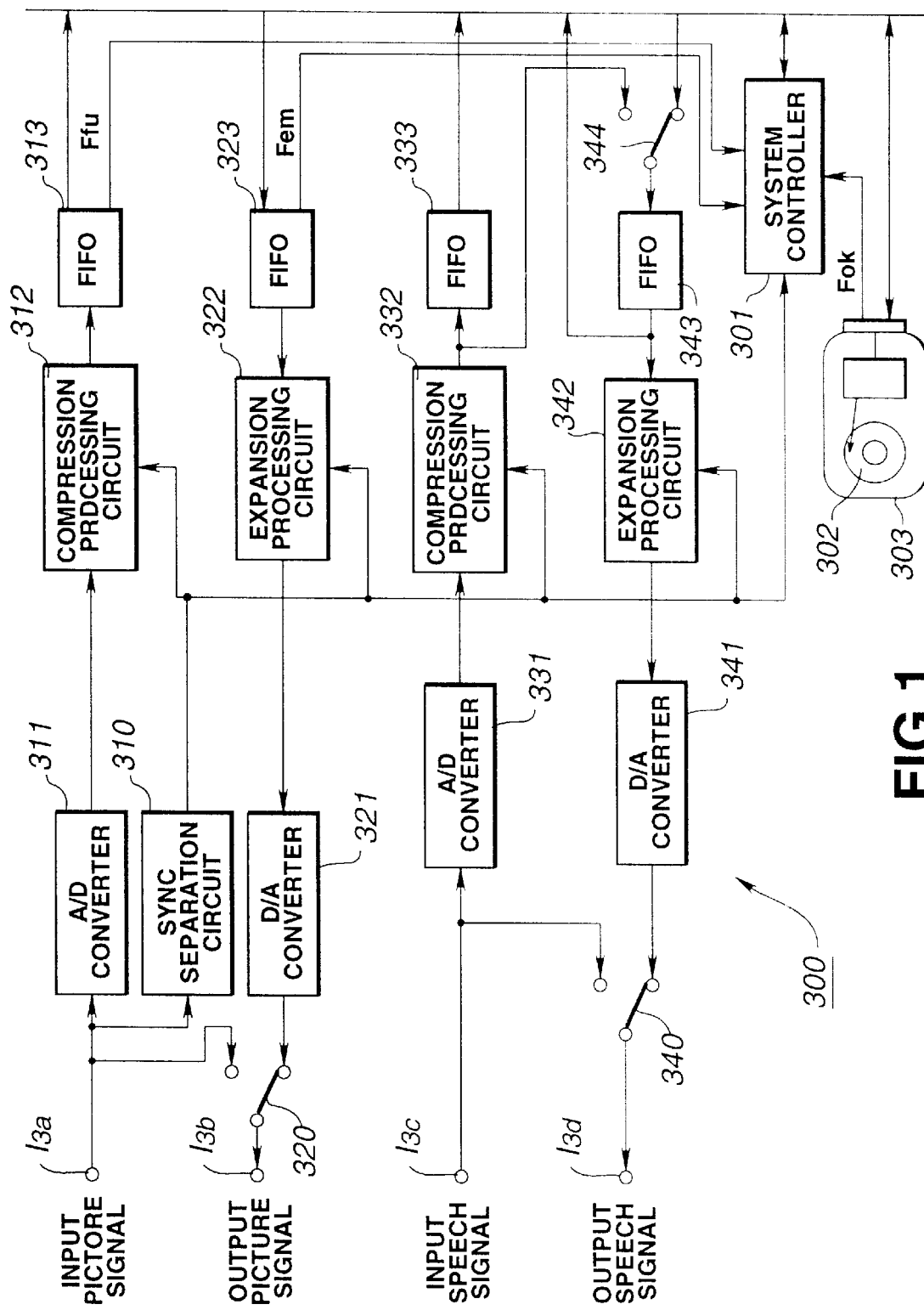
FIG. 1 is a block diagram showing a conventional recording/reproducing apparatus.
Figure 2:
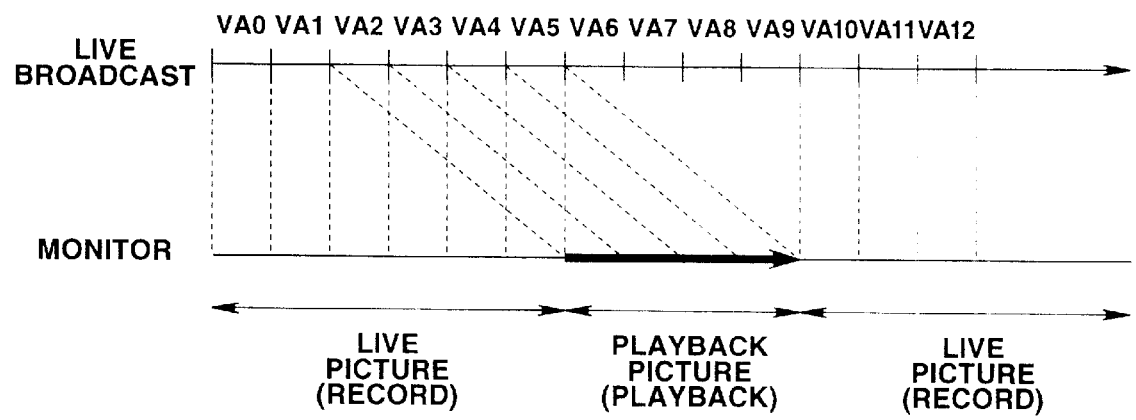
FIG. 2 illustrates a one-shot reproduction system.
Figure 3:
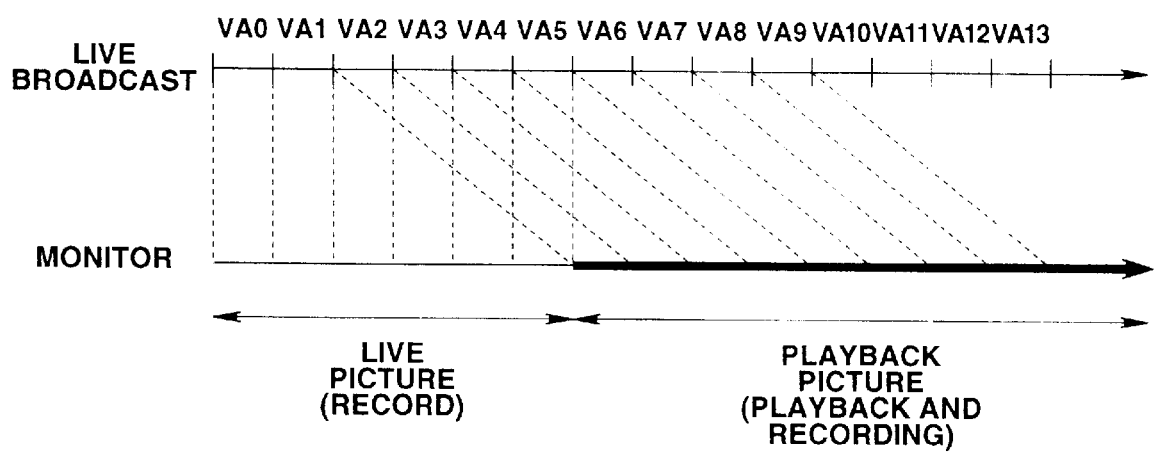
FIG. 3 illustrates the parallel recording/reproducing system.
Figure 5:
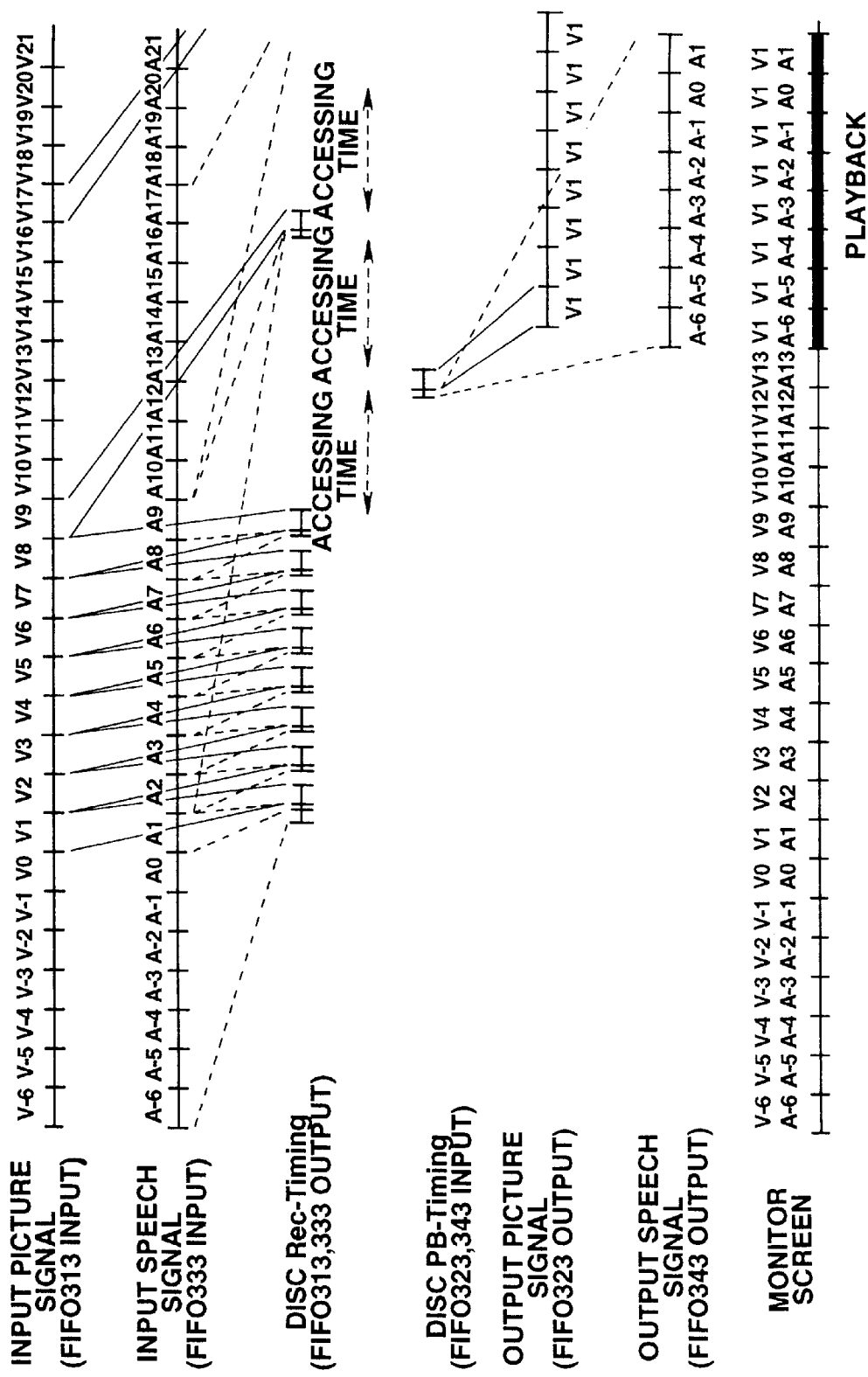
FIG. 5 shows a timing chart in case the recording/reproducing apparatus shown in FIG. 1 is set to the parallel recording/reproducing mode, with the input video signals being V-6 to V21.
Figure 6:
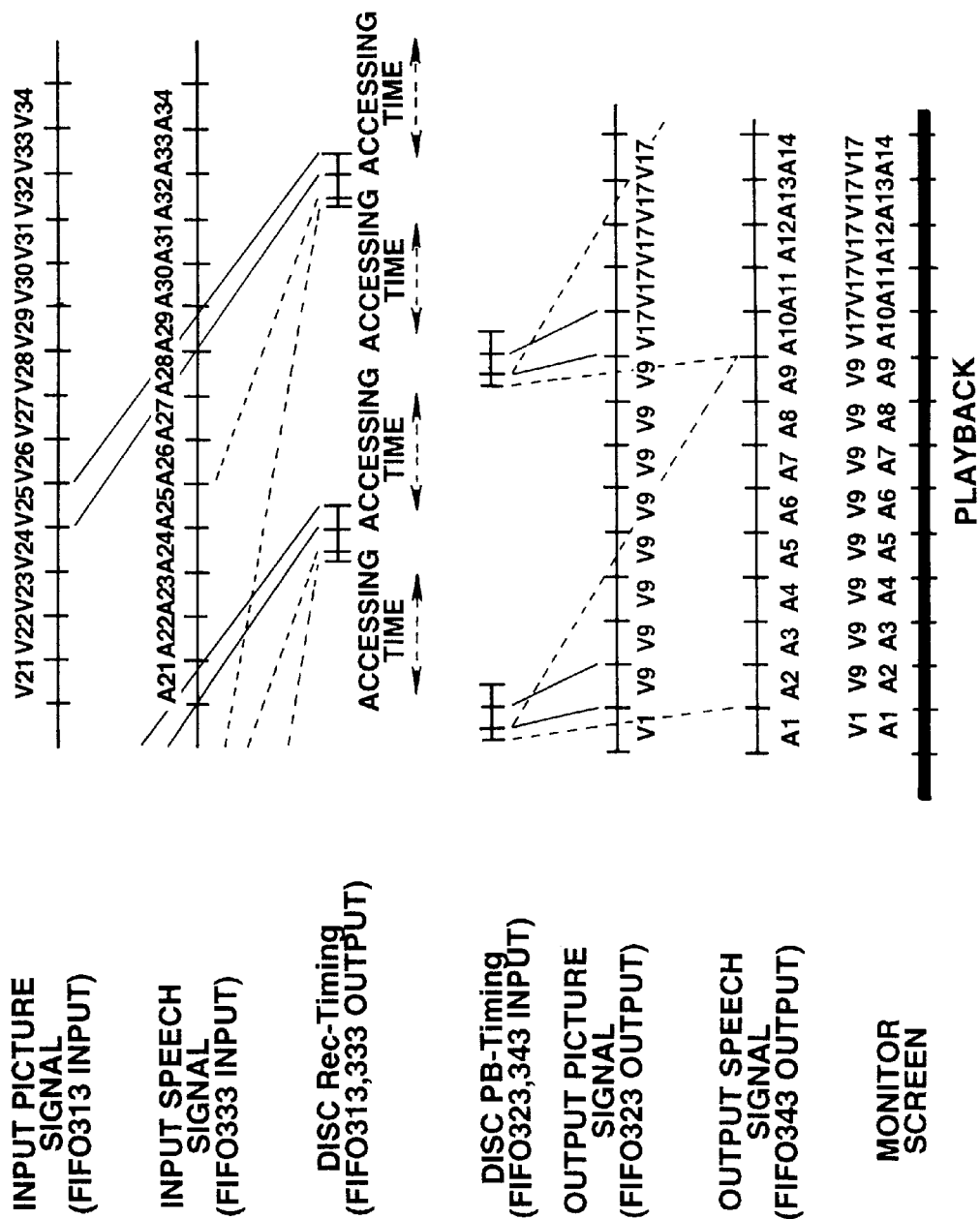
FIG. 6 shows a timing chart in case the recording/reproducing apparatus shown in FIG. 1 is set to the parallel recording/reproducing mode, with the input video signals being V21 ff.

Referring to the drawings, a preferred embodiment of the present invention will be explained in detail.

Figure 7:
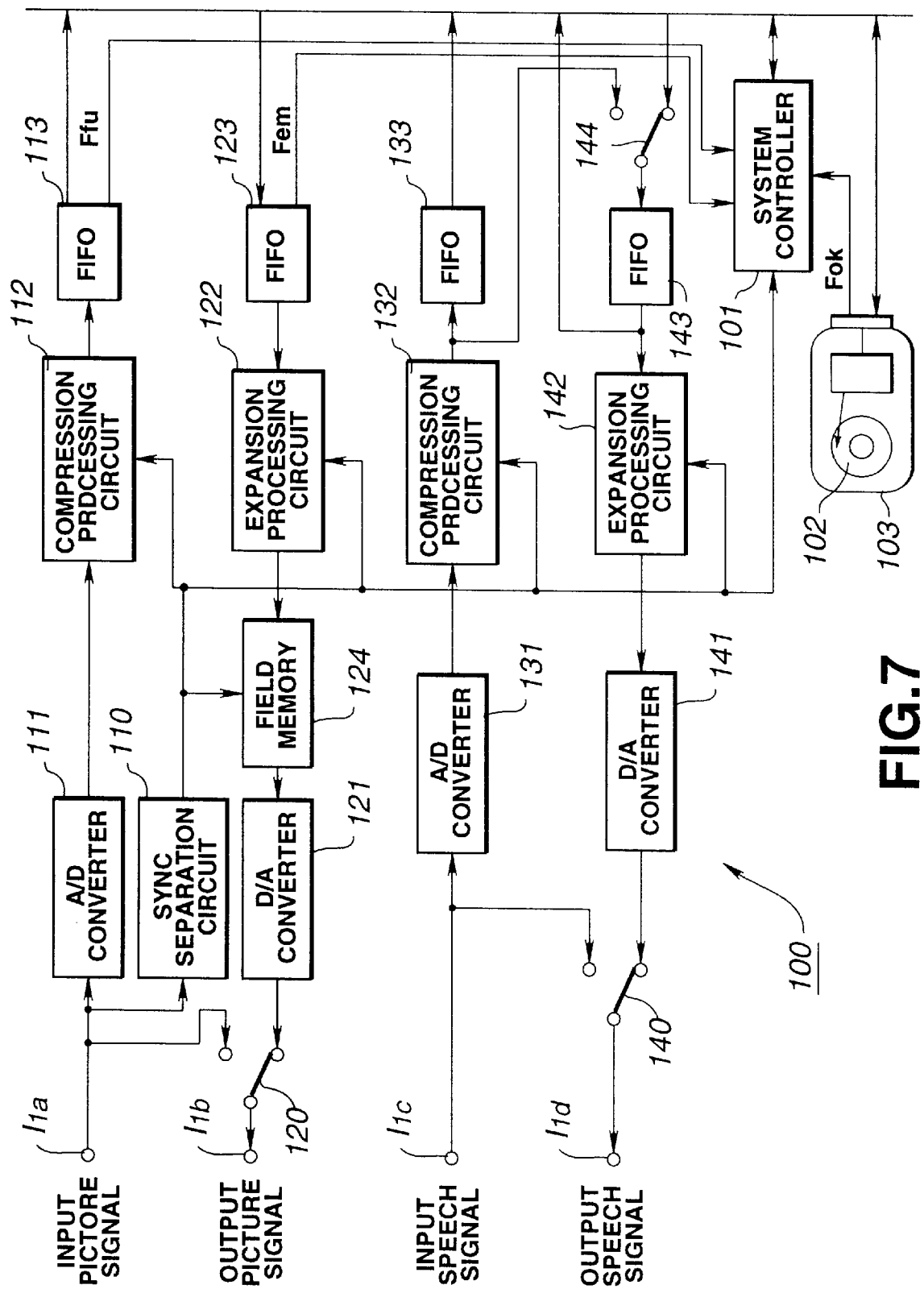
FIG. 7 is a block diagram showing the structure of a recording/reproducing apparatus according to the present invention.

The recording/reproducing apparatus is a recording/reproducing apparatus 100 shown in FIG. 7.

The recording/reproducing apparatus 100 is configured for recording/reproducing video and speech signals for an overwrite type disc 102, and uses a one-shot playback system and a parallel recording/reproducing system.

To the recording/reproducing apparatus 100 are connected a tuner 150 for receiving the live broadcast and a monitor 160 for outputting the video and the speech corresponding to the video and speech signals obtained by the recording/reproducing apparatus 100. Specifically, to input terminals $I_{1a}$, $I_{1c}$ of the recording/reproducing apparatus 100 shown in FIG. 7 is connected a tuner 150. To output terminals $I_{1b}$, $I_{1d}$ of the recording/reproducing apparatus 100 shown in FIG. 7 is connected a monitor 160. To the input terminal 11a are entered video signals from the tuner 150, whereas, to the input terminal $I_{1c}$ are supplied speech signals from the tuner 150. From the output terminal $I_{1b}$ are outputted video signals to the monitor 160, whereas, from the output terminal $I_{1d}$ are outputted speech signals to the monitor 160.

The recording/reproducing apparatus 100 is explained in more detail.

Referring to FIG. 7, the recording/reproducing apparatus 100 includes an A/D converter 111 fed with video signals via input terminal $I_{1a}$, and a synchronization separation circuit 110. The recording/reproducing apparatus 100 also includes a compression circuit 112 fed with outputs of the A/D converter 111 and the synchronization separation circuit 110. The recording/reproducing apparatus 100 also includes a FIFO buffer fed with an output of the compression circuit 112 and an A/D converter 131 fed with the speech signals entering the input terminal $I_{1c}$. The FIFO buffer 113 is referred to herein as a video recording buffer. The recording/reproducing apparatus 100 also includes a compression circuit 132 fed with outputs of the A/D converter 131 and the synchronization separation circuit 110 and a FIFO buffer 133 fed with output of the compression circuit 132. The FIFO buffer 133 is referred to herein as a speech recording buffer. The recording/reproducing apparatus 100 further includes a disc drive 103 fed with outputs of the speech recording buffer 113 and with the speech recording buffer 133.

The recording/reproducing apparatus 100 also includes a switch 144 fed with outputs of the compression circuit 132 and the disc drive 103, and FIFO buffer fed with an output of the switch 144. The FIFO buffer 143 is referred to herein as a speech reproducing buffer. The recording/reproducing apparatus 100 also includes an expansion circuit 142 fed with outputs of the speech reproducing buffer 143 and the synchronization separation circuit 110 and an D/A converter 141 fed with an output of the expansion circuit 142. The recording/reproducing apparatus 100 also includes a switch 140 fed with an output of the D/A converter 141 and with the speech signal entering the input terminal $I_{1c}$ for outputting to the monitor 160 shown in FIG. 8 and a FIFO buffer 123 fed with an output of the disc drive 103. The FIFO buffer 123 is referred to herein as a video reproducing buffer. The recording/reproducing apparatus 100 also includes an expansion circuit 122 fed with outputs of the speech reproducing buffer 123 and the synchronization separation circuit 110. The recording/reproducing apparatus 100 also includes a field memory 124 fed with an output of the expansion circuit 122 and a D/A converter 121 fed with an output of the field memory 124. The recording/reproducing apparatus 100 further includes a switch 120 fed with an output of the D/A converter 121 and the video signals entering the input terminal $I_{1a}$ for outputting via output terminal $I_{1b}$ to the monitor 160 shown in FIG. 8. An output of the speech reproducing buffer 143 is supplied to the disc drive 103.

The recording/reproducing apparatus 100 also includes a system controller 101 for controlling an output of the buffer for video recording 113 fed to the disc drive 103, an output of the buffer for speech recording 133 fed to the disc drive 103, an output of the buffer for speech reproduction 143 fed to the disc drive 103 and an output of the disc drive 103 fed to the buffer for speech reproduction 143 and to the buffer for video reproduction 123. The system controller 101 is configured for performing control processing based on a vertical synchronization signal from the synchronization separation circuit 110, a full flag $F_{fu}$ from the buffer 113 for video recording an empty flag $F_{em}$ from the buffer for and a transfer permission flag $F_{ok}$ from the disc drive 103.

The switches 120, 140 are changed over to the input terminal $I_{1a}$ and to the input terminal $I_{1c}$, respectively, during recording, while being changed over to the D/A converters 121, 141, respectively, during reproduction, under control by the system controller 101 in a manner not shown. The switch 144 is also changed over to the compression circuit 132 during recording, while being changed over to the disc drive 103 during reproduction, under control by the system controller 101 in a manner not shown.

In the recording/reproducing apparatus 100, the field memory 124 is provided on the output side of the expansion circuit 122. The field memory is fed with outputs of the expansion circuit 122 and the synchronization separation circuit 110 for outputting to the D/A converter 121. Thus the output of the expansion circuit 122 is routed via field memory 124 to the D/A converter 121.

Data input/output in the field memory 124 is controlled by the system controller 101 in a manner not shown.

The above-described recording/reproducing apparatus 100 is configured for recording video data and speech data on the disc 102 in accordance with a first format comprised of blocks of plural fields constituted by the speech and the video not thinned out on the timing axis and a second format comprised of plural blocks constituted by the speech not thinned out on the time axis and video thinned out on the time axis.

The recording/reproducing apparatus 100 is configured for managing video data and speech data for 8 V. Referring to FIG. 9A, a format 100a for one block of the first format includes speech data A1 for 1 V, a video data V1 for 1 V, speech data A2 for 1 V, a video data V2 for 1 V . . . speech data A8 for 1 V and video data V8 for 1 V, recorded in succession to the speech data A for 8 V, as shown in FIG. 9A. On the other hand, a format 300b for one block of the second format includes video data V1 and V5 for 2 V, selected from 8 V, in succession to the speech data A for 8 V.

If the recording/reproducing apparatus 100 is not set to the one-shot playback mode, to the parallel recording/reproducing mode nor to the usual mode, the recording/reproducing apparatus 100 performs the recording operation in accordance with the format 100a.

Figure 8:
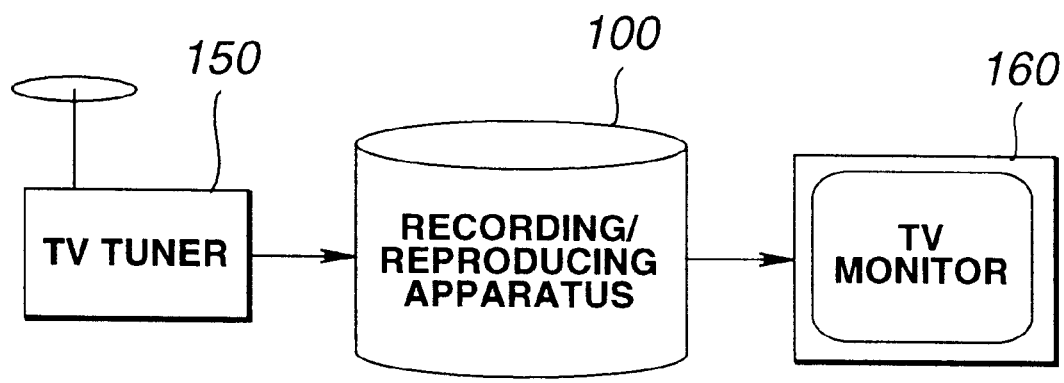
FIG. 8 is a block diagram showing a system in which a tuner and a monitor are connected to the recording/reproducing apparatus shown in FIG. 7.

Referring to FIGS. 7 and 8, a series of operations of the recording/reproducing apparatus 100 during the usual mode is explained.

The A/D converter 111 digitizes the video signals entering the input terminal $I_{1a}$ and routes the digitized video signals as video data to the compression circuit 112.

The A/D converter 131 also digitizes the speech signals entering the input terminal $I_{1c}$ and routes the digitized speech signals as speech data to the compression circuit 132.

At this time, the synchronization separation circuit 110 extracts the vertical synchronization signals from the video signals entering the input terminal $I_{1a}$ and routes the extracted vertical synchronization signals to the compression circuit 112, expansion circuit 122, compression circuit 132, expansion circuit 142 and to the system-controller 101.

The compression circuit 112 is synchronized to the vertical synchronization signals from the synchronization separation circuit 110 to encode the video data from the A/D converter 111 to write the encoded video data in the video recording buffer 113.

The compression circuit 132 is synchronized to the vertical synchronization signals from the synchronization separation circuit 110 to encode the speech data from the A/D converter 131 to write the encoded speech data in the speech recording buffer 133 and to route the encoded speech data to the switch 144.

Since the switch 144 is changed over to the compression circuit 132 under switching control of the system controller 101, in a manner not shown. Thus, the speech data encoded by the compression circuit 132 is also written via switch 144 in the speech reproducing buffer 143.

If video data for 1 V is stored in the video recording buffer 113, the video recording buffer sets the full flag $F_{fu}$ to '1' which is outputted to the system controller 101.

If the system controller 101 has recognized, by the full flag $F_{fu}(=$'1'$)$, that 1 V of video data has been stored in the video recording buffer 113, the system controller 101 issues a command and an address for data recording on the disc 102 to the disc drive 103. The system controller 101 is then in a stand-by state for receiving a transmission permission flag $F_{ok}$ from the disc drive 103.

By the address and the command from the system controller 101, the disc drive 103 outputs the transmission permission flag $F_{ok}$ to the system controller 101.

If the system controller 101 has recognized that the transmission permission flag $F_{ok}$ has been outputted by the disc drive 103, the system controller reads out speech data stored in the speech recording buffer 133 and the speech reproducing buffer 143 for routing the read-out speech data to the disc drive.

The system controller 101 also reads out the video data stored in the video recording buffer 113 to transmit the read-out data to the disc drive 103.

When the stored video data has been read out by the system controller 101, the video recording buffer 113 sets the full flag $F_{fu}$ to '0'.

Based on the address and the command from the system controller 101, the disc drive 103 records the speech data and the video data from the system controller 101 on the disc 102 in accordance with the format 100a.

By the repetition of the above-described sequence of operations, video data and speech data conforming to the live broadcast received by the tuner 150 is recorded on the disc 102 in accordance with the format 100a.

The recording operation in accordance with the format 100a of the recording/reproducing apparatus 100 will be explained in detail subsequently.

For reproducing the video data and the speech data recorded on the disc 102 as described above, the system controller 101 issues to the disc drive 103 a command and an address where the data of the disc 102 to be reproduced is recorded, and is then in stand-by state to await the transmission permission flag $F_{ok}$ from the disc drive 103.

By the address and the command from the system controller 101, the disc drive 103 outputs the transmission permission flag $F_{ok}$ to the system controller 101 and subsequently reproduces the speech data and the video data from the disc 102.

If the system controller 101 has recognized that the transmission permission flag $F_{ok}$ has been sent from the disc drive 103, the system controller 101 sends speech data reproduced from the disc drive 103 to the switch 144, while writing the video data reproduced by the disc drive 103 in the video reproducing buffer 123.

Since the switch 144 is changed over at this time to the side of the system controller 103 under switching control by the system controller 101, in a manner not shown, the speech data sent from the system controller 101 to the switch 144 is written in the speech reproducing buffer 143.

Until storage of the video data for 1 V, the video reproducing buffer 123 sets the empty flag $F_{em}$ to '1' to output the empty flag so set to the system controller 101, for placing the data transfer request for the system controller 101.

On storage of the video data for 1 V, the video reproducing buffer 123 sets the empty flag $F_{em}$ to '0' to output the empty flag so set to the system controller 101, for temporarily terminating the data transfer request for the system controller 101.

Simultaneously, the expansion circuit 122 is synchronized with the vertical synchronization signal from the synchronization separation circuit 110 to read out video data stored in the video reproducing buffer 123 for decoding.

The expansion circuit 142 is also synchronized with the vertical synchronization signal from the synchronization separation circuit 110 to read out video data stored in the speech reproducing buffer 143 for decoding.

The expansion circuit 122 routes the decoded video data via field memory 124 to the D/A converter 121.

The field memory 124 is designed to effect through-pass of video data from the expansion circuit 122 under control by the system controller 101, in a manner not shown.

The expansion circuit 142 sends the decoded speech data to the D/A converter 141.

The D/A converter 121 converts the video data supplied from the expansion circuit 122 through the field memory 124 into analog data which is supplied as video signals to the switch 120.

Since the switch 120 is changed over at this time to the side of the D/A converter 121 under switching control by the system controller 101, the video signals sent to the switch 120 from the D/A converter 121 are supplied via output terminal $I_{1b}$ to the monitor 160.

The D/A converter 141 converts the speech data from the expansion circuit 142 into analog data which is supplied to the switch 140. Thus the speech signals supplied from the D/A converter 141 to the switch 140 are supplied via output terminal $I_{1d}$ to the monitor 160.

When the video data stored in the video reproducing buffer 123 is read out by the expansion circuit 122 and fed to the monitor 160, the video reproducing buffer 123 again sets the empty flag $F_{em}$ to '1' which is outputted to the system controller 101 to request the system controller 101 to transfer data again.

This causes the system controller 101 to issue to the disc drive 103 a command and an address where the data to be reproduced next is recorded.

By repetition of the above-described playback operation, the video data and the speech data recorded on the disc 102 are reproduced. The monitor 160 displays the playback picture corresponding to the video data recorded on the disc 102, while a speaker, not shown, outputs the speech corresponding to the speech data recorded on the disc 102, that is the speech associated with the reproduced picture.

It is assumed that, by the key input by the user, the recording/reproducing apparatus 100 is set to the one-shot playback mode or the parallel recording/reproducing mode during the usual mode.

Figure 10:
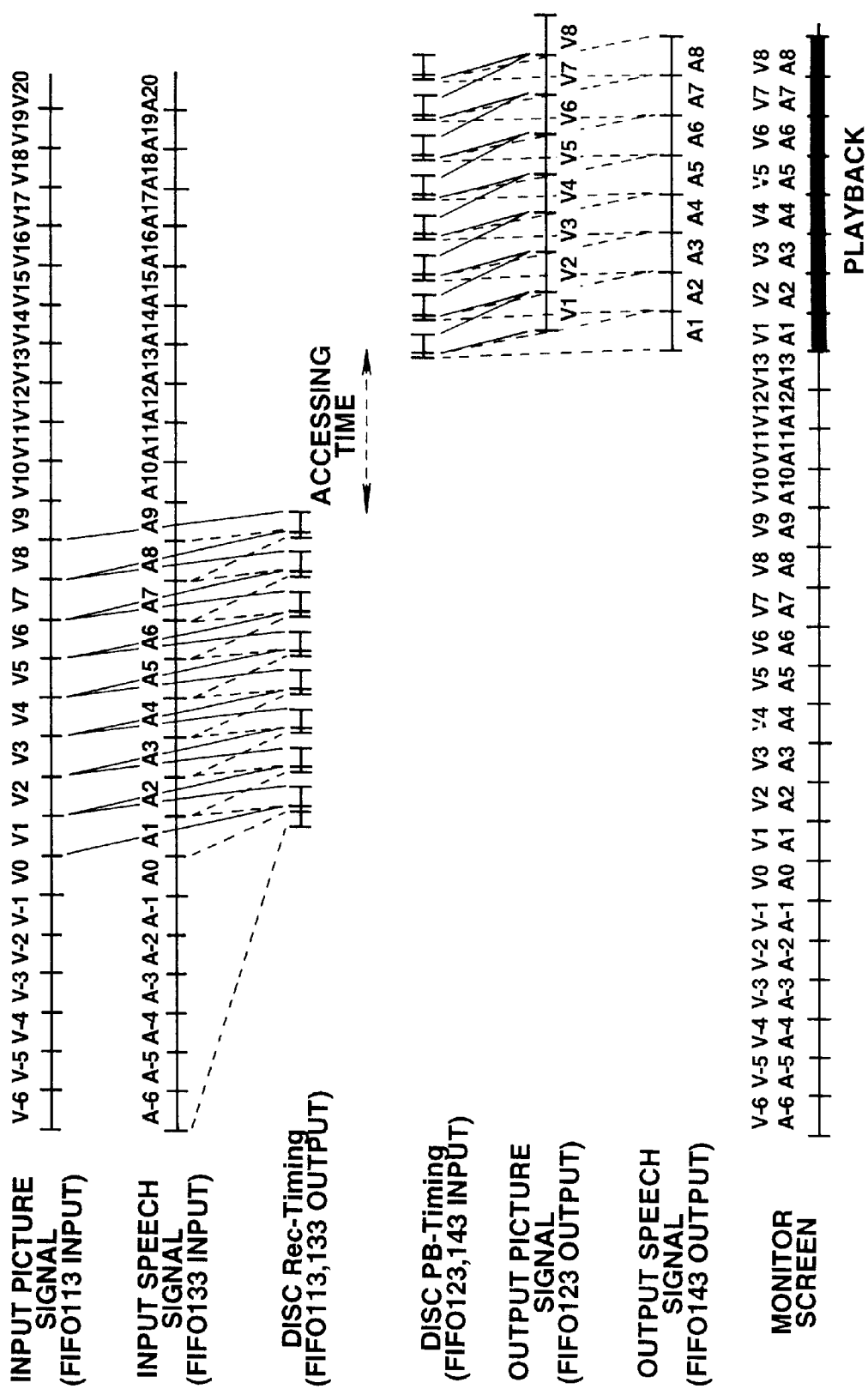
FIG. 10 is a timing chart in case the recording/reproducing apparatus shown in FIG. 7 is set to the one-shot reproducing mode.
Figure 11:
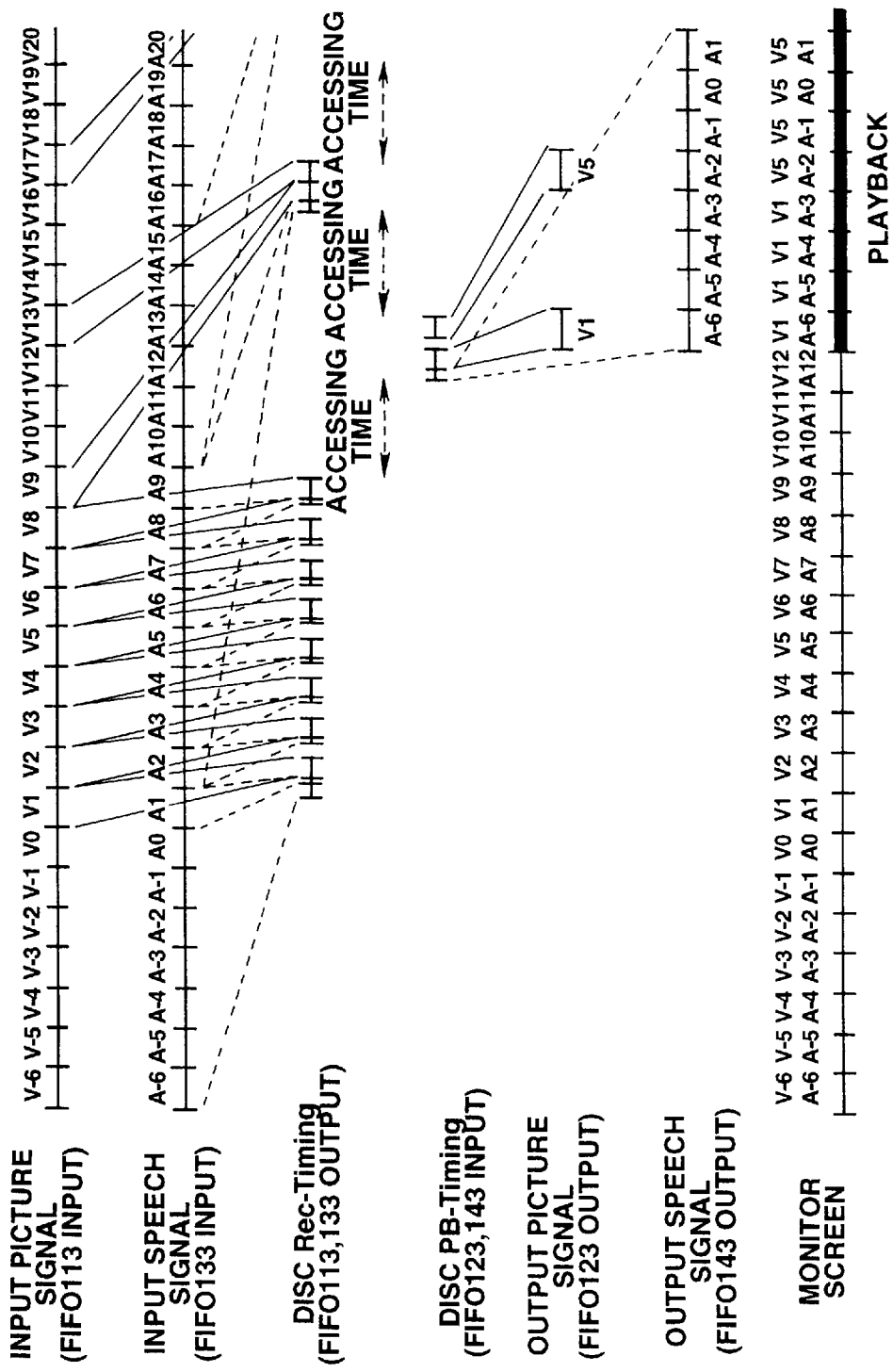
FIG. 11 shows a timing chart in case the recording/reproducing apparatus shown in FIG. 7 is set to the parallel recording/reproducing mode, with the input video signals being V-6 to V20.
Figure 12:
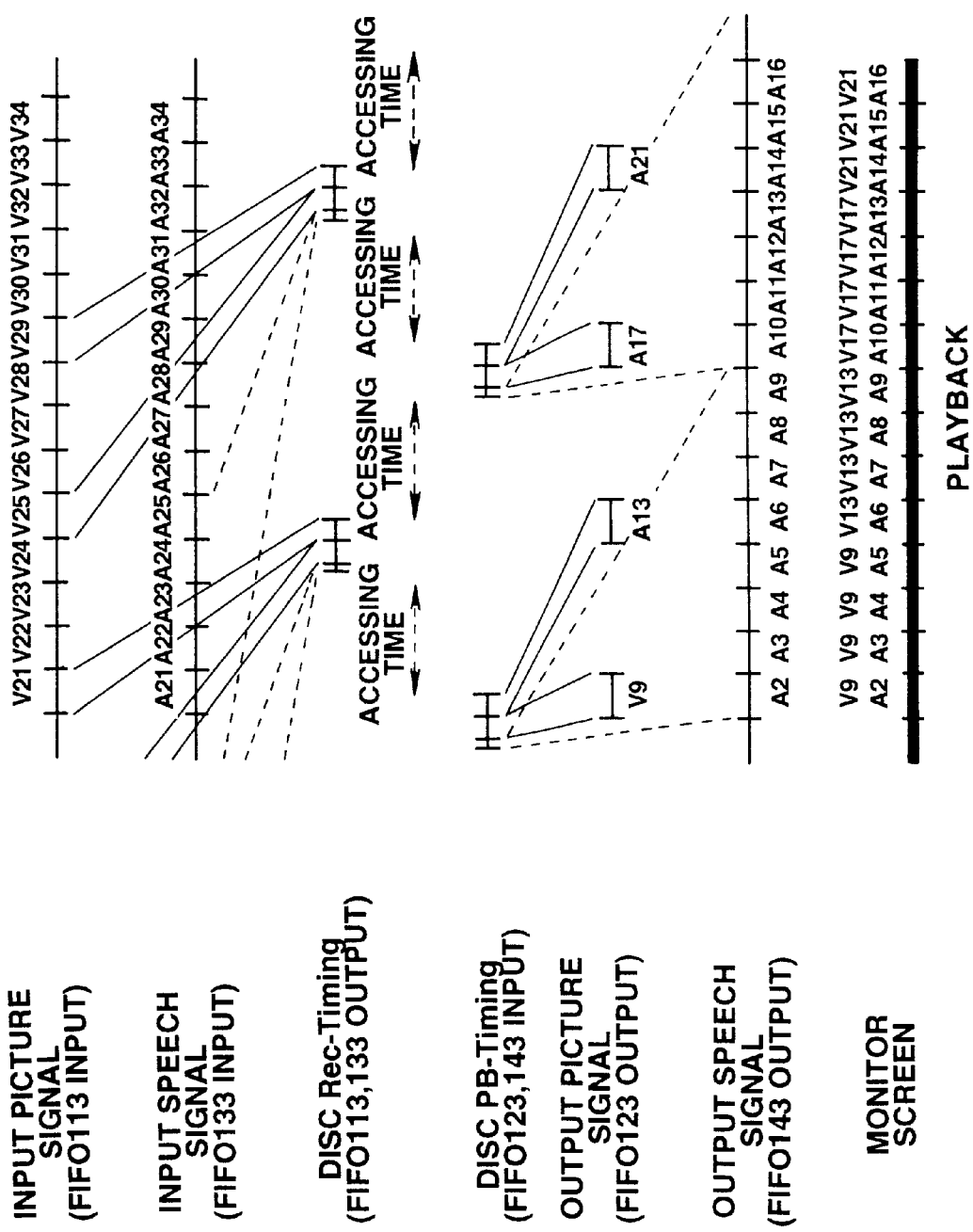
FIG. 12 shows a timing chart in case the recording/reproducing apparatus shown in FIG. 7 is set to the parallel recording/reproducing mode, with the input video signals being V20 ff.

FIG. 10 is a time chart of input/output data for the buffers 113, 123, 133, 143 when the recording/reproducing apparatus 100 is set to the one-shot playback mode, while FIGS. 11 and 12 are timing charts for the buffers 113, 123, 133, 143 when the recording/reproducing apparatus 100 is set to the parallel recording/reproducing mode during the usual mode.

In FIGS. 10 to 12, each division of video data V-6, V-5, V-4, ... and speech data A-6, A-5, A-4, ... denotes on field time of video signals.

If the recording/reproducing apparatus 100 is in the usual mode, video data and the speech data are recorded on the disc 102 in accordance with the format 100a, as described above.

Specifically, the video signals inputted during the V1 time is encoded during the same one V1 period by the compression circuit 112 so as to be written in the video recording buffer 113, as shown in FIG. 10.

When the 1V video data, that is video data V1, is stored in the video recording buffer 113, the video recording buffer 113 sets the full flag $F_{fu}$ to '1' which is outputted to the system controller 101.

By the full flag $F_{fu}$ (='1') from the vide recording buffer 113, the system controller 101 routes the command and the address for recording data on the disc 102 to the disc drive 103. The system controller 101 reads out A-6 to A0 speech data encoded in the compression circuit 132 during the V-6 to V0 period and stored in the speech recording buffer 133 from the speech recording buffer 133 to supply the read-out speech data to the drive 103.

By the address and the command from the system controller 101, the disc drive 103 records A-6 to A0 speech data from the system controller 101 on the disc 102 in accordance with the format 100a.

The system controller 101 then reads out from the speech reproducing buffer 143 encoded by the compression circuit 132 during the V1 period and stored in the buffer 143, and routes the read-out speech data to the disc drive 103.

The disc drive 103 records the A1 speech data from the system controller 101 in an address next following the A0 speech data of the disc 102 in accordance with the format 100a.

The system controller 101 reads out the V1 video data stored in the video recording buffer 113 from the video recording buffer 113 to route the read-out video data to the disc drive 103.

The disc drive 103 records the V1 video data from the system controller 101 in an address next following the A1 speech data of the disc 102 in accordance with the format 100a.

When the video data for 1 V , that is the V1 video data, is read out by the system controller 101, the video recording buffer 113 sets the full flag $F_{fu}$ to '0' which is outputted to the system controller 101.

By the full flag $F_{fu}$ (='1') from the video recording buffer 113, the system controller 101 reads out the A2 speech data encoded by the compression circuit 132 during the V2 period and stored in the speech reproducing buffer 143 from the speech reproducing buffer 143 to route the read-out data to the disc drive 103.

The disc drive 103 records the A2 speech data from the system controller 101 in an address next following the V1 video data of the disc 102 in accordance with the format 100a.

The system controller 101 reads out the V2 video data stored in the video recording buffer 113 from the video recording buffer 113 to route the read-out video data to the disc drive 103.

The disc drive 103 records the V2 video data from the system controller 101 in an address next following the A2 speech data of the disc 102 in accordance with the format 100a.

By the repetition of the above-described recording operation, block data made up of the A-6 to A0 speech data, speech data A1 for 1 V, video data V1 for 1 V, speech data A2 for 1 V, video data V2 for 1 V, . . . , speech data A8 for 1 V and video data V8 for 1 V, is recorded on the disc 102 in accordance with the format 100a, so that plural block data are recorded continuously. If, by the key input by the user, the recording/reproducing apparatus is set to the one-shot playback mode, the system controller 101 performs control for changing over the switches 120, 140 to the sides of the D/A converters 121 and 141, respectively, in a manner not shown, and for changing over the switch 144 to the side of the disc drive 103.

The system controller 101 selects a specified one of plural block data continuously recorded on the disc 102 in accordance with the format 100a and routes to the disc drive 103 the command and the address where there is recorded the A1 speech data to be reproduced first in the selected block data made up of A-6 to A0 speech data, speech data A1 for 1 V, video data V1 for 1 V, speech data A2 for 1 V, video data V2 for 1 V, speech data A8 for 1 V and video data V8 for 1 V.

The disc drive 103 reproduces A1 speech data from the disc 102 by the address and the command from the system controller 101.

The system controller 101 writes the A1 speech data obtained form the disc drive 103 via switch 144 in the speech reproducing buffer 143.

The disc drive 103 reproduces V1 video data next following A1 speech data on the disc 102.

The system controller 101 writes the V1 video data reproduced by the disc drive 103 in the video reproducing buffer 123.

Until video data for 1 V, that is V1 video Data, is stored in the video reproducing buffer 123, the video reproducing buffer 123 sets the empty flag $F_{em}$ to '1' to output the flag to the system controller 101 in order to request the system controller 101 to transfer data.

On storage of the video data for V1, the video reproducing buffer 123 transiently sets the empty flag $F_{em}$ to '0' to output the flag thus set to the system controller 101 to terminate the request for data transfer to the system controller 101 transiently.

Simultaneously, the expansion circuit 122 is synchronized with the vertical synchronization signal from the synchronization signal separating circuit 110 to read out and decode the V1 video data stored in the video reproducing buffer 123. The V1 video data decoded by the expansion circuit 122 is passed through the field memory 124, under control by the system controller 101, in a manner not shown, so as to be outputted via D/A converter 121, switch 120 and output terminal $I_{1b}$ to the monitor 160.

The expansion circuit 142 is synchronized with the vertical synchronization signal from the synchronization signal separating circuit 110 to read out and decode the A1 speech data stored in the speech reproducing buffer. The A1 speech data decoded by the expansion circuit 142 is outputted to the monitor 160 via D/A converter 141, switch 140 and output terminal $I_{1d}$.

When the stored V1 video data is read out by the expansion circuit 122 so as to be outputted to the monitor 160, the video reproducing buffer 123 again sets the empty flag $F_{em}$ to '1' to output the flag so set to the system controller 101 to start a data transfer request for the system controller 101.

The system controller 101 routes to the disc drive 103 the command and the address where the A2 speech data to be reproduced next from the system controller 101 to the disc drive 103.

The disc drive 103 reproduces the A2 speech data from the disc 102 by the address and the command from the system controller 101.

The system controller 101 writes the A2 speech data obtained from the disc drive 103 via switch 144 in the speech reproducing buffer 143.

The disc drive 103 then reproduces the V2 video data from the address next following the A2 speech data of the disc 102.

On storage of the V2 video data, the video reproducing buffer 123 transiently sets the empty flag $F_{em}$ to '0' and outputs the flag so set to the system controller 101 to terminate the data transfer request to the system controller transiently.

Simultaneously, the expansion circuit 122 is synchronized with the vertical synchronization signals from the synchronization separation circuit 110 to read out and decode V2 video data stored in the video reproducing buffer 123. The V2 video data decoded by the expansion circuit 142 is adapted to pass through the field memory 124 under control by the system controller 101, in a manner not shown so as to be outputted via D/A converter 121, switch 120 and output terminal $I_{1b}$ so as to be outputted to the monitor 160.

The expansion circuit 142 is synchronized with the vertical synchronization signals from the synchronization separation circuit 110 to read out and decode A2 speech data stored in the speech reproducing buffer. The A2 speech data decoded by the expansion circuit 142 is outputted via D/A converter 141, switch 140 and output terminal $I_{1d}$ so as to be outputted to the monitor 160.

Thus, if the playback mode set is the one-shot playback mode, the above-described playback operation is repeatedly performed for reproducing the A1 to A8 speech data and V1 to V8 video data recorded on the disc 102. The monitor 160 displays a playback picture corresponding to the V1 to V8 video data, while the speaker, not shown, outputs the speech corresponding to the A1 to A8 speech data, that is the speech corresponding to the reproduced picture.

On the other hand, if the recording/reproducing apparatus 100b is set to the parallel recording/reproducing mode, by, for example, the key entry by the user, the system controller 101 performs controls for changing over the switches 120 and 140 to the sides of the D/A converter 121 and the D/A converter 141, respectively, while also performing control for changing over the switch 144 to the side of the disc drive 103, in a manner not shown.

Referring to FIG. 11, the system controller 101 selects a specified one of plural block data recorded continuously on the disc 102 in accordance with the format 100a and routes to the disc drive 103 the command and the address of the selected block data, made up of the A-6 to A0 speech data, speech data A1, video data V1, speech data A2, video data V2, ..., speech data A8 and video data V8, where the speech data A-6 to A0 to be reproduced first is recorded.

The disc drive 103 reproduces the speech data A-6 to A0 by the address and the command from the system controller 101.

The system controller 101 writes the speech data A-6 to A0 obtained by the disc drive 103 in the speech reproducing buffer 143 via switch 144.

The system controller 101 then routes to the disc drive 103 the command and the address where the V1 video data are recorded.

The disc drive 103 reproduces the V1 video data from an address next following the A1 speech data of the disc 102 by the address and the command from the system controller 101.

The system controller 101 writes the V1 video data obtained from the disc drive 103 in the video reproducing buffer 123.

Until storage of the video data for 1 V, that is the V1 video data, the video reproducing buffer 123 sets the empty flag $F_{em}$ to '1' to output the empty flag so set to the system controller 101, for placing the data transfer request with the system controller 101.

On storage of the V1 video data, the video reproducing buffer 123 transiently sets the empty flag $F_{em}$ to '0' to output the empty flag so set to the system controller 101, for temporarily terminating the data transfer request for the system controller 101.

Simultaneously, the expansion circuit 122 reads out and decodes the video data V1 stored in the video reproducing buffer 123.

In the case of the parallel recording/reproducing mode, the V1 video data decoded by the expansion circuit 122 is written in the field memory 124, in synchronism with the vertical synchronization signals from the synchronization separation signals from the synchronization separation circuit 110, under control by the system controller 101, in a manner not shown, and is adapted to pass through the field memory 124 so as to be outputted via D/A converter 121, switch 120 and output terminal $I_{1b}$ so as to be outputted to the monitor 160.

The expansion circuit 142 is synchronized with the vertical synchronization signals from the synchronization separation circuit 110 to read out and decode A-6 speech data stored in the speech reproducing buffer 143. The A-6 speech data decoded by the expansion circuit 142 is outputted via D/A converter 141, switch 140 and output terminal $I_{1d}$ so as to be outputted to the monitor 160.

If the V1 video data is read out by the expansion circuit 122 and outputted to the monitor 160, the video reproducing buffer 123 again sets the empty flag $F_{em}$ to '1' to output the flag so set to the system controller 101 to start the data transfer request to the system controller 101.

Thus the system controller 101 routes the command and the address where the V5 vide data is recorded to the disc drive 103.

The disc drive 103 reproduces the V5 video data from the disc 102 by the address and the command from the system controller 101.

The system controller 101 writes the V5 video data obtained from the disc drive 103 in the video reproducing buffer 123.

On storage of the V5 video data, the video reproducing buffer 123 transiently sets the empty flag $F_{em}$ to '0' to output the empty flag so set to the system controller 101, for temporarily terminating the data transfer request for the system controller 101 .

If, in the parallel recording/reproducing mode, the V1 video data is written in the field memory 124, data readout in the video reproducing buffer 123 or the data writing in the field memory 124 is not performed until end of outputting of A-6 to A-3 speech data for 4 V comes to a close, that is for four fields.

That is, during the next 1 V, the V1 video data written in the field memory 124 is outputted, in synchronism with the vertical synchronization signals from the synchronization separation circuit 110, via the D/A converter 121, switch 120 and output terminal $I_{1b}$ to the monitor 160, under control by the system controller 101, in a manner not shown.

Simultaneously, the expansion circuit 142 reads out and decodes the A-5 speech data stored in the speech reproducing buffer synchronism with the vertical synchronization signals from the synchronization separation circuit 110. The A-5 speech data, decoded by the expansion circuit 142, is outputted via D/A converter 141, switch 140 and output terminal $I_{1d}$ to the monitor 160.

During the next 1V period, the V1 video data, written in the field memory 124, is outputted, in synchronism with the vertical synchronization signals from the synchronization separation circuit 110, via D/A converter 121, switch 120 and output terminal $I_{1b}$ sequentially to the monitor 160 under control by the system controller 101, in a manner not shown.

Simultaneously, the expansion circuit 142 reads out and decodes the A-4 speech data stored in the speech reproducing buffer in synchronism with the vertical synchronization signals from the synchronization separation circuit 110. The A-4 speech data, decoded by the expansion circuit 142, is outputted via D/A converter 141, switch 140 and output terminal $I_{1d}$ to the monitor 160.

During the next 1V period, the V1 video data, written in the field memory 124, is outputted, in synchronism with the vertical synchronization signals from the synchronization separation circuit 110, via D/A converter 121, switch 120 and output terminal $I_{1b}$ to the monitor 160 under control by the system controller 101, in a manner not shown.

Simultaneously, the expansion circuit 142 reads out and decodes the A-3 speech data stored in the speech reproducing buffer in synchronism with the vertical synchronization signals from the synchronization separation circuit 110. The A-3 speech data, decoded by the expansion circuit 142, is outputted via D/A converter 141, switch 140 and output terminal $I_{1d}$ sequentially to the monitor 160.

During the next 1V period, the expansion circuit 122 reads out V5 video data stored in the video reproducing buffer for decoding.

The V5 video data, decoded by the expansion circuit 122, is written in the field memory 124, in synchronism with the vertical synchronization signals from the synchronization separation circuit 110, under control by the system controller 101, in a manner not shown. The V5 video data is also allowed to pass through the field memory 124 and outputted via D/A converter 121, switch 120 and output terminal $I_{1b}$ sequentially to the monitor 160. The The expansion circuit 142 reads out and decodes A-2 speech data stored in the speech reproducing buffer in synchronism with the vertical synchronization signals from the synchronization separation circuit 110. The A-2 speech data recorded in the expansion circuit 142 is outputted via D/A converter 141, switch 140 and output terminal $I_{1d}$ sequentially to the monitor 160.

If the V5 video data has been written in the field memory 124, data readout in the video reproducing buffer 123 or data writing in the field memory 124 is not performed until outputting of the A2 to A1 speech data to the monitor 160 comes to a close, that is for a four-field period.

During the three-field period as from the next 1 V, three fields of the V5 video data is outputted to the monitor 160, in synchronism with the vertical synchronization signals from the synchronization separation circuit 110, at the same time as A-1, A0 and A1 speech data are outputted to the monitor 160.

This reproduces V1 video data, V5 video data and A-6 to A1 speech data.

It V5 video data has been stored in the video reproducing buffer 123, the recording/reproducing apparatus performs a recording operation conforming to the format 100b. If the playback mode is the parallel reproducing mode, the video compressing operation is executed every four fields. In FIG. 11, V9 video data, V13 video data, V17 video data and V21 video data and so forth are compressed and stored in the video recording buffer 113.

The system controller 101 routes a command and an address to be recorded data of the disc 102 to the disc drive 103 and then enters into the state of awaiting the transfer permission flag $F_{ok}$ from the disc drive 103.

On recognition of the outputting of the transfer permission flag $F_{ok}$ from the disc drive 103, the system controller 101 reads out speech data A2 to A9 for 8 V stored in the speech recording buffer 133 to route the read-out speech data to the disc drive 103.

By the address and the command from the system controller 101, the disc drive 103 records the speech data A2 to A9 for 8 V from the system controller 101 in an address next following the A9 speech data of the disc drive 102 in accordance with the format 100b.

The system controller 101 also sequentially reads out V9 video data and V13 video data stored in the video recording buffer 113 to route the read-out data to the disc drive 103.

Thus, the speech data A2 to A9, V9 video data and V13 video data are recorded on the disc 102 in continuation to the block data recorded in accordance with the format 100b.

The recording/reproducing apparatus 100 reproduces the speech data A2 to A9 for 8 V and V9, V13 video data for 2 V recorded in accordance with the format 100b as described above.

As in the reproducing operation for the V1 and v5 video data and the speech data A9 to A1, described above, the system controller 101 routes to the disc drive 103 the command and the address where the A2 to A9 speech data for 8 V are recorded.

By the address and the command from the system controller 101, the disc drive 103 reproduces the speech data A2 to A9 for 8 V from the disc 102.

The system controller 101 writes the speech data A2 to A9 for 8 V reproduced by the disc drive 103 in the speech reproducing buffer 143 via switch 144.

The system controller 101 then routes to the disc drive 103 the command and the address where the V9 video data has been recorded.

By the address and the command from the system controller 101, the disc drive 103 reproduces V9 video data from the address next following the A9 speech data of the disc 102.

The system controller 101 writes the V9 video data reproduced by the disc drive 103 in the video reproducing buffer 123.

Until storage of the V9 video data, the video reproducing buffer 123 sets the empty flag $F_{em}$ to '1' to output the empty flag so set to the system controller 101, for placing the data transfer request with the system controller 101.

On storage of the V9 video data, the video reproducing buffer 123 transiently sets the empty flag $F_{em}$ to '0' to output the empty flag so set to the system controller 101, for temporarily terminating the data transfer request for the system controller 101.

Simultaneously, the expansion circuit 122 reads out and decodes the V9 video data stored in the video reproducing buffer 123.

The V9 video data decoded by the expansion circuit 122 is written in the field memory 124, in synchronism with the vertical synchronization signals from the synchronization separation circuit 110 under control by the system controller 101, in a manner not shown. The V9 video data is also allowed to pass through the field memory 124 and outputted via D/A converter 121, switch 120 and output terminal $I_{1b}$ sequentially to the monitor 160.

The expansion circuit 142 reads out and decodes A-2 speech data stored in the speech reproducing buffer in synchronization with the vertical synchronization signals from the synchronization separation circuit 110. The A2 speech data decoded by the expansion circuit 142 is outputted via D/A converter 141, switch 140 and output terminal $I_{1d}$ to the monitor 160.

If the V9 video data is read by the expansion circuit 122 and outputted to the monitor 160 shown in FIG. 8, the video reproducing buffer 123 again sets the empty flag $F_{em}$ to '1' and outputs the flag so set to the system controller 101 to start data transfer request to the system controller 101.

The system controller 101 thus routes to the disc drive 103 the command and the address where is recorded the V13 video data.

By the address and the command from the system controller 101, the disc drive 103 reproduces V13 video data from the address next following the V9 video data of the disc 102.

The system controller 101 writes the V13 video data reproduced by the disc drive 103 in the video reproducing buffer 123.

On storage of the V13 video data, the video reproducing buffer 123 transiently sets the empty flag $F_{em}$ to '0' to output the empty flag so set to the system controller 101, for temporarily terminating the data transfer request for the system controller 101.

Once the V9 video data has been written in the field memory 124, data readout in the video reproducing buffer 123 or data writing in the field memory 124 is not performed until the outputting of the A2 to A5 speech data to the monitor 160 comes to a close, that is for a four-field period.

Thus, during the three-field period, beginning from the next 1V, three fields of the V9 video data are outputted to the monitor 160, in synchronism with the vertical synchronization signals from the synchronization separation circuit 110, while A3 to A5 speech data are outputted to the monitor 160.

During the next 1V period, the the expansion circuit 122 reads out V13 video data stored in the video reproducing buffer for decoding.

The V13 video data, decoded by the expansion circuit 122, is written in the field memory 124, in synchronism with the vertical synchronization signals from the synchronization separation circuit 110, under control by the system controller 101, in a manner not shown. The V13 video data is also allowed to pass through the field memory 124 and outputted via D/A converter 121, switch 120 and output terminal $I_{1b}$ sequentially to the monitor 160.

The expansion circuit 142 reads out and decodes A6 speech data stored in the speech reproducing buffer in synchronism with the vertical synchronization signals from the synchronization separation circuit 110. The A6 speech data recorded in the expansion circuit 142 is outputted via D/A converter 141, switch 140 and output terminal $I_{1d}$ sequentially to the monitor 160.

If the V13 video data has been written in the field memory 124, data readout in the video reproducing buffer 123 or data writing in the field memory 124 is not performed until outputting of the A6 to A9 speech data to the monitor 160 comes to a close, that is for a four-field period.

During the three-field period as from the next 1V, three fields of the V13 video data is outputted to the monitor 160, in synchronism with the vertical synchronization signals from the synchronization separation circuit 110, at the same time as A7, A8 and A9 speech data are outputted to the monitor 160.

This reproduces the V9 and V13 video data and the A2 to A9 speech data recorded on the disc 102 in accordance with the format 100b.

If the V9 video data are stored in the video reproducing buffer 123, the recording operation for V17 video data, V21 video data and A10 to A17 speech data similar to the above-described recording operation for V9 video data, V13 video data and A2 to A9 speech data is carried out in the recording/reproducing apparatus 100 in accordance with the format 100b.

The above-described recording and reproducing operations are then carried out by the recording/reproducing apparatus 100 until 'stop' of the parallel recording/reproducing mode is commanded such as by key input by the user.

As described above, the recording/reproducing apparatus 100 uses, as a second format comprised of plural blocks constituted by the speech not thinned out on the time axis and video thinned out on the time axis, such a format 100b comprised of speech data for 8 V followed by two fields of the video data, and includes the field memory 124 for freezing the video data decoded by the expansion circuit 122 on the output side of the expansion circuit 124, so that the number of reproduced frames can be easily increased without increasing the number of accessing to the disc 102 during the parallel recording/reproducing mode. Thus the recording/reproducing apparatus 100 can produce a satisfactory playback picture even if the playback mode is the parallel recording/reproducing mode.

In recording/reproducing apparatus 100, since the block data conforming to the format 100a or 100b are continuously recorded on the disc 102, and the reproducing operations begins from a specified one of the plural block data continuously recorded on the disc, which is in accord with the format 100a, it is managed by the system controller 101 in accordance with which of the format 100a or the format 100b has been recorded the reproduced block format.

Figure 13:
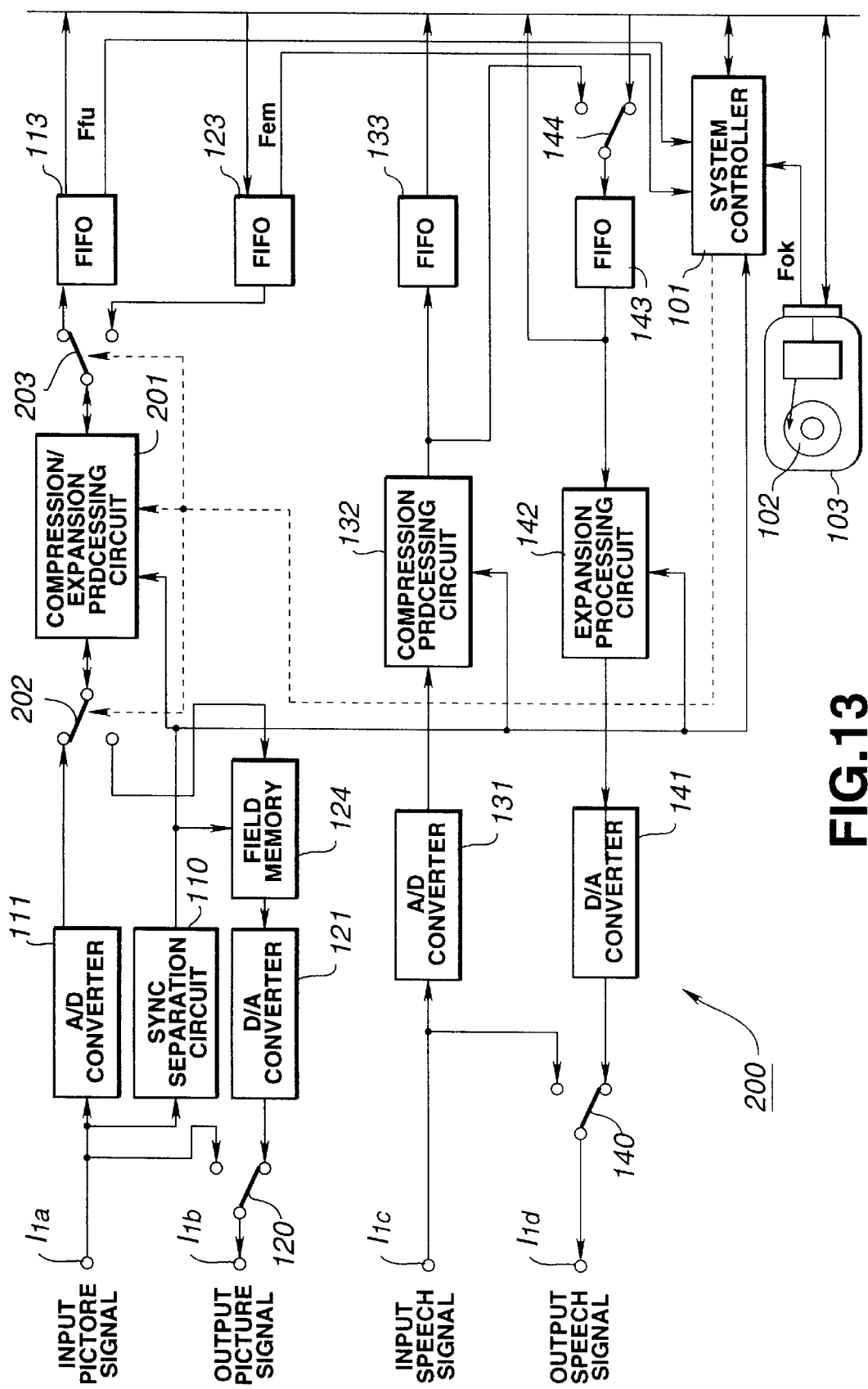
FIG. 13 is a block diagram showing a recording/reproducing apparatus in which a compression circuit and an expansion circuit are unified together.

The recording/reproducing apparatus according to the present invention is applied to a recording/reproducing apparatus 200 shown in FIG. 13.

The recording/reproducing apparatus 200 is configured so that the compression circuit 112 and the expansion circuit 122 of the recording/reproducing apparatus 100 shown in FIG. 7 are unified together. Thus the recording/reproducing apparatus 200 includes a compression/expansion (companding) circuit 201 having both the functions of the compression circuit 112 and the expansion circuit 122, a switch 202 provided on the input or output side of the companding circuit 201 and a switch 203 provided on the output or input side of the companding circuit 201.

The switch 202 is configured for switching between an output to the companding circuit 201 of the A/D converter 111 and an output to the field memory 124 of the companding circuit 201 under control by the system controller 101.

The switch 203 is configured for switching between an output to the video recording buffer 113 of the companding circuit 201 and an output to the companding circuit 201 of the video reproducing buffer 123 under control by the system controller 101.

Switching between the processing function for the compression circuit 112 (compression mode) and the function for the expansion circuit 122 (expansion mode) owned by the companding circuit 201 is also controlled by the system controller 101.

That is, the system controller 101 controls the switches 202, 203 for switching to the A/D converter 111 and to the video recording buffer 113, respectively, during recording, by way of controlling the companding circuit 201 to operate under the compression mode. The system controller 101 also controls the switches 202, 203 for switching to the field memory 124 and to the video reproducing buffer 123, respectively, during reproduction, by way of controlling the companding circuit 201 to operate under the expansion mode.

Figure 14:
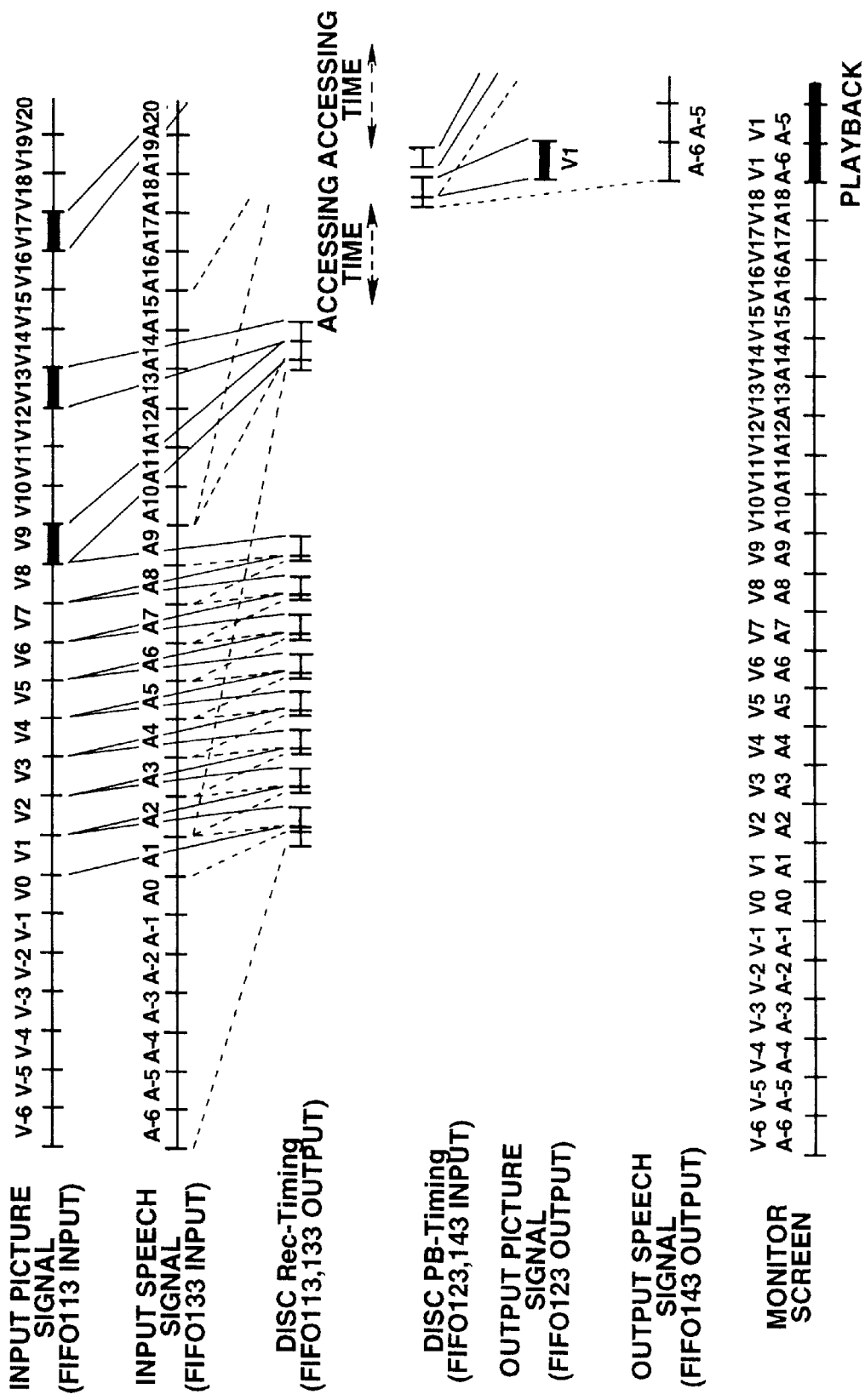
FIG. 14 shows a timing chart in case the recording/reproducing apparatus shown in FIG. 7 is set to the parallel recording/reproducing mode, with the input video signals being V-8 to V20.

FIGS. 14, 15 are timing charts for input/output data for the buffers 113, 123, 133 and 143 for the case in which the recording/reproducing apparatus 200 is set to the parallel recording/reproducing mode.

In FIGS. 14 and 15, each division of the video data V-6, V-5, V-4, . . . and speech data A-6, A-5, A-4, denotes one field time duration of video signals.

Referring to FIGS. 14 and 15, the operation of the recording/reproducing apparatus 200 when set to the parallel recording/reproducing mode is explained.

In the recording/reproducing apparatus 200, the parts or components operating similarly to those of the recording/reproducing apparatus 100 shown in FIG. 7 are denoted by the same numerals and are not explained. The operation of the recording/reproducing apparatus 200 during the normal operation and the one-shot playback mode is similar to that of the recording/reproducing apparatus 100 during the normal operation and the one-shot playback mode, so that the detailed description is omitted for simplicity.

First, if the recording/reproducing apparatus 200 is in the usual mode, the video data and the speech data are recorded on the disc 102 in accordance with the format 100a, as explained previously.

If the recording/reproducing apparatus 200 is set to the parallel recording/reproducing mode by the key input by the user, the recording/reproducing apparatus 200 records video data and speech data in accordance with the format 100b, in contrast to the recording/reproducing apparatus 100 selecting a specified one of plural block data continuously recorded on the disc 102 in accordance with the format 100a, and reproducing video data and speech data of the selected block data.

That is, at an input timing of video signals during the V9 period, the system controller 101 controls the switches 202 and 203 to be set to the side of the A/D converter 111 and to the side of the video recording buffer 113, respectively, and controls the companding circuit 201 to operate in the compression mode.

The companding circuit 201 is synchronized to the vertical synchronization signals from the synchronization separation circuit 110 for encoding the V9 video data supplied from the A/D converter 111 via switch 202 for writing the encoded data in the video recording buffer 113 via switch 203.

Also, at an input timing of video signals during the V13 period, the system controller 101 controls the switches 202 and 203 to be set to the side of the A/D converter 111 and to the side of the video recording buffer 113, respectively, and controls the companding circuit 201 to operate in the compression mode.

The companding circuit 201 is synchronized to the vertical synchronization signals from the synchronization separation circuit 110 for encoding the V13 video data supplied from the A/D converter 111 via switch 202 for writing the encoded data in the video recording buffer 113 via switch 203.

If the video data V9 and V13 have been stored in the video recording buffer 113, the system controller 101 routes the command and the address of recording data on the disc 102 to the disc drive 103 and is set to the state of awaiting the transfer permission flag $F_{ok}$ from the disc drive 103.

By the address and the command from the system controller 101, the disc drive 103 outputs the transfer permission flag $F_{ok}$ to the controller 101.

On recognition of the outputting of the transfer permission flag $F_{ok}$ from the disc drive 103, the system controller 101 reads out speech data A2 to A9 for 8 V encoded by the compression circuit 132 during the periods from V2 to V9 and stored in the speech recording buffer 133 to route the read-out speech data to the disc drive 103.

By the address and the command from the system controller 101, the disc drive 103 records the speech data A2 to A9 for 8 V from the system controller 101.

The system controller 101 also sequentially reads out V9 video data and V13 video data stored in the video recording buffer 113 to route the read-out data to the disc drive 103.

The disc drive 103 records the V9 and V13 video data from the system controller 101 in an address next following the A9 speech data of the disc 102 in accordance with the format 100b.

Also, at an input timing of video signals during the V17 period, the system controller 101 controls the switches 202 and 203 to be set to the side of the A/D converter 111 and to the side of the video recording buffer 113, respectively, and controls the companding circuit 201 to operate in the compression mode.

The companding circuit 201 is synchronized to the vertical synchronization signals from the synchronization separation circuit 110 for encoding the V17 video data supplied from the A/D converter 111 via switch 202 for writing the encoded data in the video recording buffer 113 via switch 203.

When the operation of recording speech data A2 to A9 for 8 V and V9, V13 video data for 2 V, in accordance with the format 100b, comes to a close, the recording/reproducing apparatus 200 proceeds to a reproducing operation.

First, the switch 144 is changed over to the side of the disc drive 103, under control by the system controller 101, in a manner not shown.

The system controller 101 routes to the disc drive 103 the command and the address where the speech data A-6 to A1 are recorded on the disc 102.

By the address and the command from the system controller 101, the disc drive 103 reproduces the speech data A-6 to A1 from the disc 102.

The system controller 101 writes the speech data A-6 to A1 obtained by the disc drive 103 in the speech reproducing buffer 143 via switch 144.

The system controller 101 then routes the command and the address where the V1 video data has been recorded on the disc 101 to the disc drive 103.

By the address and the command from the system controller 101, the disc drive 103 reproduces the V1 video data from the disc 102.

The system controller 101 writes the V1 video data obtained form the disc drive 103 in the video reproducing buffer 123.

Until storage of the V1 video data, the video reproducing buffer 123 sets the empty flag $F_{em}$ to '1' to output the empty flag so set to the system controller 101, for placing the data transfer request with the system controller 101.

On storage of the V1 video data, the video reproducing buffer 123 transiently sets the empty flag $F_{em}$ to '0' to output the empty flag so set to the system controller 101, for temporarily terminating the data transfer request for the system controller 101.

At this time, the system controller 101 controls the switches 202 and 203 to be set to the side of the field memory 124 and to the side of the video reproducing buffer 123, respectively, and controls the companding circuit 201 to operate in the compression mode.

The companding circuit 201 reads out and decodes the V1 video data stored in the video reproducing buffer 123 in synchronism with the vertical synchronization signals from the synchronization separating circuit 110.

The V1 video data, decoded by the companding circuit 201, is written in the field memory 124, in synchronism with the vertical synchronization signals from the synchronization separation circuit 110, under control by the system controller 101, in a manner not shown. The V1 video data is also allowed to pass through the field memory 124 and outputted via D/A converter 121, switch 120 and output terminal $I_{1b}$ sequentially to the monitor 160.

The expansion circuit 142 reads out and decodes A-6 speech data stored in the speech reproducing buffer 143 in synchronism with the vertical synchronization signals from the synchronization separation circuit 110. The A-6 speech data decoded by the expansion circuit 142 is outputted via D/A converter 141 and output terminal $I_{1d}$ sequentially to the monitor 160.

If the V1 video data is read by the companding circuit 201 and outputted to the monitor 160, the video reproducing buffer 123 again sets the empty flag $F_{em}$ to '1' and outputs the flag so set to the system controller 101 to start data transfer request to the system controller 101.

The system controller 101 thus routes to the disc drive 103 the command and the address where the V5 video data is recorded on the disc 102.

By the address and the command from the system controller 101, the disc drive 103 reproduces V5 video data from the disc 102.

The system controller 101 writes the V5 video data obtained by the disc drive 103 in the video reproducing buffer 123.

On storage of the V5 video data, the video reproducing buffer 123 transiently sets the empty flag $F_{em}$ to '0' to output the empty flag so set to the system controller 101, for temporarily terminating the data transfer request for the system controller 101.

Once the V1 video data has been written in the field memory 124, data readout in the video reproducing buffer 123 or data writing in the field memory 124 is not performed until the outputting of the speech A-6 to A-3 data to the monitor 160 comes to a close, that is for a four-field period, as in the case of the parallel recording/reproducing mode for the recording/reproducing apparatus 100. Thus, during the three-field period, beginning from the next 1V, three fields of the V1 video data are outputted to the monitor 160, in synchronism with the vertical synchronization signals from the synchronization separation circuit 110, while speech data A-5, A-4 and A-3 are outputted to the monitor 160.

Also, at an input timing of video signals during the V21 period, during the four fields of the V1 video data outputted to the monitor 160, the system controller 101 controls the switches 202 and 203 to be set to the side of the A/D converter 111 and to the side of the video recording buffer 113, respectively, and controls the companding circuit 201 to operate in the compression mode.

The companding circuit 201 is synchronized to the vertical synchronization signals from the synchronization separation circuit 110 for encoding the V21 video data supplied from the A/D converter 111 via switch 202 for writing the encoded data in the video recording buffer 113 via switch 203.

When the V1 video data have been outputted to the monitor 160 during the four-field period, the system controller 101 controls the switches 202 and 203 to be set to the side of the field memory 124 and to the side of the video reproducing buffer 123, respectively, and controls the companding circuit 201 to operate in the expansion mode.

The V5 video data, decoded by the companding circuit 201, is written in the field memory 124, in synchronism with the vertical synchronization signals from the synchronization separation circuit 110, under control by the system controller 101, in a manner not shown. The V5 video data is also allowed to pass through the field memory 124 and outputted via D/A converter 121, switch 120 and output terminal $I_{1b}$ to the monitor 160.

The expansion circuit 142 reads out and decodes A6 speech data stored in the speech reproducing buffer 143 in synchronism with the vertical synchronization signals from the synchronization separation circuit 110. The A-2 speech data recorded in the expansion circuit 142 is outputted via D/A converter 141, switch 140 and output terminal $I_{1d}$ to the monitor 160.

If the V5 video data has been written in the field memory 124, data readout in the video reproducing buffer 123 or data writing in the field memory 124 is not performed until outputting of the speech data A-2 to A1 to the monitor 160 comes to a close, that is for a four-field period, as in the operation during the parallel recording/reproducing mode in the recording/reproducing apparatus 100.

During the three-field period as from the next 1V, three fields of the V5 video data is outputted to the monitor 160, in synchronism with the vertical synchronization signals from the synchronization separation circuit 110, at the same time as speech data A-1, A0 and A1 are outputted to the monitor 160.

Also, at an input timing of the V5 video signals during the V25 period, during the outputting of the four fields of the V5 video data to the monitor 160, the system controller 101 controls the switches 202 and 203 to be set to the side of the A/D converter 111 and to the side of the video recording buffer 113, respectively, and controls the companding circuit 201 to operate in the compression mode.

The companding circuit 201 is synchronized to the vertical synchronization signals from the synchronization separation circuit 110 for encoding the V25 video data supplied from the A/D converter 111 via switch 202 for writing the encoded data in the video recording buffer 113 via switch 203.

When the reproducing operation for the A-6 to A1 speech data, V1 vide data and the V5 video data comes to a close, as described above, the recording/reproducing apparatus 200 proceeds to the recording operation.

The system controller 101 controls the switches 202 and 203 to be set to the side of the A/D converter 111 and to the side of the video recording buffer 113, respectively, and controls the companding circuit 201 to operate in the compression mode.

The system controller 101 routes a command and an address in which to record data of the disc 102 to the disc drive 103 and then enters into the state of awaiting the transfer permission flag $F_{ok}$ from the disc drive 103.

By the address and the command from the system controller 101, the disc drive 103 outputs the transfer permission flag $F_{ok}$ to the system controller 101.

On recognition of the outputting of the transfer permission flag $F_{ok}$ from the disc drive 103, the system controller 101 reads out speech data A10 to A17 encoded by the compression circuit 132 during the period V10 to V17 and stored in the speech recording buffer 133 to route the read-out speech data to the disc drive 103.

By the address and the command from the system controller 101, the disc drive 103 records the speech data A10 to A17 for 8 V from the system controller 101 in an address next following the V13 video data of the disc drive 102 in accordance with the format 100b.

The system controller 101 also sequentially reads out V17 video data and V21 video data stored in the video recording buffer 113 to route the read-out data to the disc drive 103.

When the operation of recording speech data A10 to A17 and V17, V21 video data in accordance with the format 100b comes to a close, the recording/reproducing apparatus 200 proceeds to a reproducing operation.

The system controller 101 routes to the disc drive 103 the command and the address where the speech data A2 to A9 are recorded on the disc 102.

By the address and the command from the system controller 101, the disc drive 103 reproduces the speech data A2 to A9 from the disc 102.

The system controller 101 writes the speech data A2 to A9 obtained by the disc drive 103 in the speech reproducing buffer 143 via switch 144.

By the address and the command from the system controller 101, the disc drive 103 reproduces the V9 video data from an address next following the A9 speech data of the disc 102.

The system controller 101 writes the V9 video data obtained from the disc drive 103 in the video reproducing buffer 123.

Until storage of the V9 video data, the video reproducing buffer 123 sets the empty flag $F_{em}$ to '1' to output the empty flag so set to the system controller 101, for placing the data transfer request with the system controller 101.

On storage of the V9 video data, the video reproducing buffer 123 transiently sets the empty flag $F_{em}$ to '0' to output the empty flag so set to the system controller 101, for temporarily terminating the data transfer request for the system controller 101.

At this time, the system controller 101 controls the switches 202 and 203 to be set to the side of the field memory 124 and to the side of the video reproducing buffer 123, respectively, and controls the companding circuit 201 to operate in the expansion mode.

The companding circuit 201 reads out and decodes the V9 video data stored in the video reproducing buffer 123 in synchronism with the vertical synchronization signals from the synchronization separating circuit 110.

The V9 video data, decoded by the expansion circuit 122, is written in the field memory 124, in synchronism with the vertical synchronization signals from the synchronization separation circuit 110, under control by the system controller 101, in a manner not shown. The V9 video data is also allowed to pass through the field memory 124 and outputted via D/A converter 121, switch 120 and output terminal $I_{1b}$ sequentially to the monitor 160.

The expansion circuit 142 reads out and decodes A2 speech data stored in the speech reproducing buffer 143 in synchronism with the vertical synchronization signals from the synchronization separation circuit 110. The A2 speech data decoded by the expansion circuit 142 is outputted via D/A converter 141, switch 140 and output terminal $I_{1d}$ sequentially to the monitor 160.

If the V9 video data is read by the companding circuit 201 and outputted to the monitor 160, the video reproducing buffer 123 again sets the empty flag $F_{em}$ to '1' and outputs the flag so set to the system controller 101 to start data transfer request to the system controller 101.

The system controller 101 thus routes to the disc drive 103 the command and the address where the V5 video data is recorded on the disc 102.

By the address and the command from the system controller 101, the disc drive 103 reproduces V13 video data from the address next following the V9 video data of the disc 102.

The system controller 101 writes the V13 video data obtained by the disc drive 103 in the video reproducing buffer 123.

On storage of the V13 video data, the video reproducing buffer 123 transiently sets the empty flag $F_{em}$ to '0' to output the empty flag so set to the system controller 101, for temporarily terminating the data transfer request for the system controller 101.

Once the V9 video data has been written in the field memory 124, data readout in the video reproducing buffer 123 or data writing in the field memory 124 is not performed until the outputting of the speech data A2 to A5 to the monitor 160 comes to a close, that is for a four-field period, as in the case of the parallel recording/reproducing mode for the recording/reproducing apparatus 100.

Thus, during the three-field period, beginning from the next 1V, three fields of the V9 video data are outputted to the monitor 160, in synchronism with the vertical synchronization signals from the synchronization separation circuit 110, while speech data A3, A4 and A5 are outputted to the monitor 160.

Also, at an input timing of video signals during the V29 period, during outputting of the four fields of the V9 video data to the monitor 160, the system controller 101 controls the switches 202 and 203 to be set to the side of the A/D converter 111 and to the side of the video recording buffer 113, respectively, by way of controlling the companding circuit 201 to operate in the compression mode.

The companding circuit 201 is synchronized to the vertical synchronization signals from the synchronization separation circuit 110 for encoding the V29 video data supplied from the A/D converter 111 via switch 202 for writing the encoded data in the video recording buffer 113 via switch 203.

When the V9 video data have been outputted the monitor 160 during the four-field period, the system controller 101 controls the switches 202 and 203 to be set to the side of the field memory 124 and to the side of the video reproducing buffer 123, respectively, and controls the companding circuit 201 to operate in the expansion mode.

The companding circuit 201 reads out and decodes the V13 video data stored in the video reproducing buffer 123 in synchronism with the vertical synchronization signals from the synchronization separation circuit 110.

The V13 video data, decoded by the companding circuit 201, is written in the field memory 124, in synchronism with the vertical synchronization signals from the synchronization separation circuit 110, under control by the system controller 101, in a manner not shown. The V13 video data is also allowed to pass through the field memory 124 and outputted via D/A converter 121, switch 120 and output terminal $I_{1b}$ sequentially to the monitor 160.

The expansion circuit 142 reads out and decodes A6 speech data stored in the speech reproducing buffer 143 in synchronism with the vertical synchronization signals from the synchronization separation circuit 110. The A6 speech data recorded in the expansion circuit 142 is outputted via D/A converter 141, switch 140 and output terminal $I_{1d}$ sequentially to the monitor 160.

If the V13 video data has been written in the field memory 124, data readout in the video reproducing buffer 123 or data writing in the field memory 124 is not performed until the outputting of the speech data A6 to A9 to the monitor 160 comes to a close, that is for a four-field period, as in the operation during the parallel recording/reproducing mode in the recording/reproducing apparatus 100.

Thus, during the three-field period as from the next 1V, three fields of the V5 video data is outputted to the monitor 160, in synchronism with the vertical synchronization signals from the synchronization separation circuit 110, at the same time as speech data A7, A8 and A9 are outputted to the monitor 160.

Also, at an input timing of the V33 video signals during the V25 period, during the outputting of the four fields of the V13 video data to the monitor 160, the system controller 101 controls the switches 202 and 203 to be set to the side of the A/D converter 111 and to the side of the video recording buffer 113, respectively, and controls the companding circuit 201 to operate in the compression mode.

The companding circuit 201 is synchronized to the vertical synchronization signals from the synchronization separation circuit 110 for encoding the V33 video data supplied from the A/D converter 111 via switch 202 for writing the encoded data in the video recording buffer 113 via switch 203.

When the reproducing operation for the speech data A2 to A9, V9 vide data and the V13 video data comes to a close, as described above, the recording/reproducing apparatus 200 proceeds to the recording operation.

The above-described recording and reproducing operations are then carried out by the recording/reproducing apparatus 200 until 'stop' of the parallel recording/reproducing mode is commanded such as by key input by the user.

In the above-described recording/reproducing apparatus 200, the timing of encoding the video signals is alternated with the timing of decoding the encoded video signals for carrying out the encoding of the video signals and the decoding of the encoded vide signals by a sole circuit, that is the companding circuit 201, thus eliminating the necessity of separately providing the compression circuit and the expansion circuit as in the case of the conventional recording/reproducing apparatus. The result is that the recording/reproducing apparatus 200 can be reduced in cost.

As described above, the recording/reproducing apparatus 200 uses, as a second format comprised of plural blocks constituted by the speech not thinned out on the time axis and video thinned out on the time axis, such a format 100b comprised of speech data for 8 V followed by the video data for 2 V, and includes the field memory 124 for freezing the video data decoded by the companding circuit 201 on the output side of the expansion circuit 124, so that the number of reproduced frames can be easily increased without increasing the number of accessing to the disc 102 during the parallel recording/reproducing mode. Thus the recording/reproducing apparatus 200 can produce a satisfactory playback picture even if the playback mode is the parallel recording/reproducing mode.

The format shown in FIG. 9B in the present embodiment is merely exemplary and is not intended for limiting the present invention. Specifically, the operation with 8 V as a division or the video of two fields in the format 100b as the second format is not limiting the present invention.

What is claimed is:

1. A recording/reproducing apparatus in which video signals and audio signals are recorded in synchronism with each other on a random-accessible recording medium and in which the video signals and the audio signals are reproduced in synchronism with each other from the recording medium, said video signals being subdivided into a plurality of video data units and said audio signals being subdivided into a plurality of audio data units, the apparatus comprising:

storage means for storing the video signals reproduced from the recording medium;

decoding means for decoding the video signals stored in said storage means;

holding means for holding the video signals decoded by the decoding means, said holding means generating a status flag; and control means for controlling substantially simultaneous recording and reproducing operations for said audio and video signals;

whereby the status flag is transmitted to said control means and indicates whether the control means should start data transfer or temporarily terminate data transfer, and whereby said reproducing operation includes generating a sequence of video data units wherein the video data units are the same from unit-to-unit, generating a sequence of audio data units wherein the audio data units are different from unit-to-unit, and coordinating playback of said sequence of video data units with playback of said sequence of audio data units such that the repeated video data unit is matched with a sequence of different audio data units.

2. A recording/reproducing apparatus in which video signals and audio signals are recorded in synchronism with each other on a random-accessible recording medium and in which the video signals and the audio signals are reproduced in synchronism with each other from the recording medium, said video signals being subdivided into a plurality of video data units and said audio signals being subdivided into a plurality of audio data units, the apparatus comprising:

playback video signal storage means for storing video signals reproduced from the recording medium;

playback audio signal storage means for storing audio signals reproduced from the recording medium;

video signal decoding means for decoding video signals stored in said playback video signal storage means;

audio signal decoding means for decoding audio signals stored in said playback audio signal storage means;

holding means for holding video signals decoded by said video signal decoding means, said holding means generating a status flag; and control means for controlling substantially simultaneous recording and reproducing operations for said audio and video signals;

whereby the status flag is transmitted to said control means and indicates whether the control means should start data transfer or temporarily terminate data transfer, and whereby said reproducing operation includes generating a sequence of video data units wherein the video data units are the same from unit-to-unit, generating a sequence of audio data units wherein the audio data units are different from unit-to-unit, and coordinating playback of said sequence of video data units with playback of said sequence of audio data units such that the repeated video data unit is matched with a sequence of different audio data units.

3. The recording/reproducing apparatus as claimed in claim 2, wherein said video data units and audio data units are fields.

4. The recording/reproducing apparatus as claimed in claim 2, wherein said control means is operable to control said holding means to associate at least one of said video data units with four different audio data units.

5. The recording/reproducing apparatus as claimed in claim 1, wherein said control means controls address management and data transfer for said recording medium.

6. The recording/reproducing apparatus as claimed in claim 1, wherein said recording medium is disc-shaped.

7. The recording/reproducing apparatus as claimed in claim 1, further comprising:

reproduction mode setting means;

said reproduction mode setting means being operable to select between a usual reproduction mode, a one-shot reproduction wherein the recording operation can be temporarily interrupted for performing a reproduction operation, or a parallel recording/reproducing mode wherein recording and reproduction are performed in a continuous alternating manner such that recording and reproduction appear simultaneous to a user of the apparatus.

8. A recording/reproducing apparatus in which video signals and audio signals are recorded in synchronism with each other on a random-accessible recording medium and in which the video signals and the audio signals are reproduced in synchronism with each other from the recording medium, said video signals being subdivided into a plurality of video data units and said audio signals being subdivided into a plurality of audio data units, the apparatus comprising:

playback video signal storage means for storing video signals reproduced from the recording medium;

playback audio signal storage means for storing audio signals reproduced from the recording medium;

video signal decoding means for decoding video signals stored in said playback video signal storage means;

audio signal decoding means for decoding audio signals stored in said playback audio signal storage means;

video signal encoding means for encoding input video signals;

audio signal encoding means for encoding input audio signals;

input video signal storage means for storing an output of said video signal encoding means;

input audio signal storage means for storing an output of said audio signal encoding means;

holding means for holding video signals decoded by said video signal decoding means, said holding means generating a status flag; and control means for controlling substantially simultaneous recording and reproducing operations for said audio and video signals such that video data units output from said input video signal storage means and audio data units output from said input audio signal storage means are alternately recorded on said recording medium;

whereby the status flag is transmitted to said control means and indicates whether the control means should start data transfer or temporarily terminate data transfer, and whereby said reproducing operation includes generating a sequence of video data units wherein the video data units are the same from unit-to-unit, generating a sequence of audio data units wherein the audio data units are different from unit-to-unit, and coordinating playback of said sequence of video data units with playback of said sequence of audio data units such that the repeated video data unit is matched with a sequence of different audio data units.

9. A recording/reproducing apparatus in which video signals and audio signals are recorded in synchronism with each other on a random-accessible recording medium and in which the video signals and the audio signals are reproduced in synchronism with each other from the recording medium, said video signals being subdivided into a plurality of video data units and said audio signals being subdivided into a plurality of audio data units, the apparatus comprising:

playback video signal storage means for storing video signals reproduced from the recording medium;

a compression/expansion circuit for encoding input video signals and for decoding the video signals stored in said playback video signal storage means;

input video signal storage means for storing an output of said compression/expansion circuit;

playback audio signal storage means for storing the audio signals reproduced from said recording medium;

audio signal decoding means for decoding audio signals stored in said playback audio signal storage means;

audio signal encoding means for encoding input audio signals;

input audio signal storage means for storing an output of said audio signal encoding means;

holding means for holding video signals decoded by said compression/expansion circuit, said holding means generating a status flag; and control means for controlling substantially simultaneous recording and reproducing operations for said audio and video signals such that video data units output from said input video signal storage means and audio data units output from said input audio signal storage means are alternately recorded on said recording medium, and for switching said compression/expansion circuit between the functions of compression and expansion during simultaneous recording and reproduction;

whereby the status flag is transmitted to said control means and indicates whether the control means should start data transfer or temporarily terminate data transfer, and whereby said reproducing operation includes generating a sequence of video data units wherein the video data units are the same from unit-to-unit, generating a sequence of audio data units wherein the audio data units are different from unit-to-unit, and coordinating playback of said sequence of video data units with playback of said sequence of audio data units such that the repeated video data unit is matched with a sequence of different audio data units.

10. The recording/reproducing apparatus as claimed in claim 9, wherein said video data units and audio data units are fields, and said control means controls simultaneous recording and reproducing so that recording and reproduction are alternated according to an eight field cycle.

11. The recording/reproducing apparatus as claimed in claim 9, wherein said control means inhibits writing to the holding means during the time a predetermined number of said audio data units are output by said audio signal decoding means.

* * * * *